US005387430A

United States Patent [19]

Tkac

[11] Patent Number: 5,387,430

[45] Date of Patent: Feb. 7, 1995

[54] BY-PRODUCT FRACTIONS FROM DEBRANNED WHEAT

[75] Inventor: Joseph J. Tkac, Port Colborne, Canada

[73] Assignee: Tkac & Timm Enterprises Limited, Ontario, Canada

[21] Appl. No.: 114,271

[22] Filed: Aug. 30, 1993

Related U.S. Application Data

[63] Continuation-in-part of Ser. No. 286,347, Dec. 19, 1988, Pat. No. 5,240,733, which is a continuation-in-part of Ser. No. 64,067, Jun. 18, 1987, abandoned.

[30] Foreign Application Priority Data

Dec. 16, 1988 [CA] Canada .................................. 586260

[51] Int. Cl.[6] ................................................ A23L 1/10

[52] U.S. Cl. .................................... 426/627; 426/481; 426/482; 426/483; 426/656

[58] Field of Search ............... 426/627, 656, 481, 482, 426/483

[56] References Cited

U.S. PATENT DOCUMENTS

| | | | |
|---|---|---|---|
| 1,543,458 | 6/1925 | Takamine, Jr. | 426/627 |
| 2,018,966 | 10/1935 | Miller et al. | 83/42 |
| 2,392,365 | 1/1946 | Carter | 241/7 |
| 2,464,212 | 3/1949 | Carter et al. | 241/7 |
| 2,742,235 | 4/1956 | Moen | 241/9 |
| 2,745,748 | 5/1956 | McCashen | 426/622 |
| 2,847,167 | 8/1958 | Szasz | 241/5 |
| 3,226,041 | 12/1965 | Graumann | 241/9 |
| 3,362,649 | 1/1968 | Odden | 241/11 |
| 3,399,839 | 9/1968 | Anderson et al. | 241/11 |
| 3,979,375 | 9/1976 | Rao et al. | 426/482 |
| 4,741,913 | 5/1988 | Satake | 426/483 |

FOREIGN PATENT DOCUMENTS 328666 10/1957 Japan .

OTHER PUBLICATIONS

"Dietary Fibre For Foods", by Woodstone Food Labs of Winnipeg, Manitoba, Canada 1984.

"Microscopic Structure and Composition of the Wheat Kernel" Wheat Chemistry and Technology, 2nd Edition, 1971, Chapter 3 pp. 51-81.

"We Present Steinmetz-The International Patent Bread, Steinmetz", Approx. 1971.

Spicher et al Translation of Article from Gertreide Mehl and Brot, Jun. 1983, pp. 185-189, "Investigation on the Behavior of the Microb of Durum Wheat During Scouring".

*Primary Examiner*—Helen Pratt
*Attorney, Agent, or Firm*—Volpe and Koenig

[57] ABSTRACT

Selective removal of the bran layers from wheat kernels prior to tempering results in the recovery of specialty bran products consisting of the seed coat, nucellar and aledrone layers of the removed bran coat. The removed layers have a protein content of between 18-30% measured on a dry basis and are useful as ingredients in breakfast cereals, binders, breads and snack foods, premium feeds and rusk thereby resulting in value added products for the mill or selective reintroduction of bran layers to flour after, or during, further milling.

9 Claims, 8 Drawing Sheets

BY-PRODUCT FRACTIONS FROM DEBRANNED WHEAT

This application is a continuation-in-part of U.S. application Ser. No. 07/286,347, filed Dec. 19, 1988, now issued as U.S. Pat. No. 5,240,733, which is a continuation-in-part of U.S. application Ser. No. 07/064,067, filed Jun. 18, 1987, now abandoned.

BACKGROUND OF THE INVENTION

The present invention relates to the bran by-product fractions recovered during the removal of bran from cereal grains prior to the milling of flour and/or semolina production. In particular, the present invention relates to a by-product fractions recovered after the grain kernels and particularly wheat kernels are processed to debranning steps prior to the traditional tempering operation in preparation for milling.

The general objective of the milling process is to extract from the wheat kernel the maximum amount of endosperm in the purest form. The endosperm is either ground into flour or semolina. This requires the efficient separation of the components of the wheat kernels, namely the bran, endosperm, and germ. Bran and germ have a detrimental effect on the end milled products, flour or semolina.

In the conventional milling process, after the initial cleaning steps, the wheat kernels are conditioned with water and/or steam and allowed to rest in temper bins for 4 to 20 hours (tempering) to toughen the bran coats of the wheat kernels and soften or mellow the endosperm. Tempering of the wheat kernels fuses the bran coats together and is an essential conditioning step of the kernels carried out prior to the conventional milling process to alter the physical state of the kernels in a desired manner. Tempering is undoubtedly the most important factor in determining the amount of endosperm produced from given wheat kernels and, therefore, great care is taken to appropriately condition the kernels prior to milling.

The tempering of the wheat kernels to toughen and fuse the bran coats, unfortunately, also causes some fusion of the endosperm to the inner layers of bran whereby separation of these components is more difficult. The conditioned kernels are then subjected to successive stages, each of which grind, separate and purify the product. The first grinding operation (first break) opens the tempered kernels to expose the endosperm and scrape a portion of the endosperm from the bran. The coarsely ground mixture of bran, germ and endosperm particles is then sifted to classify the particles for further grinding, purification or sifting. The finer classified particles, which are a mixture of endosperm, bran and germ are then sent to the appropriate purification steps. The coarse remainder, consisting of bran and adhering endosperm, is sent to the next grinding step (second break) to remove more of the endosperm from the bran. The process of grinding, sifting and purification is repeated up to five or six times (5 or 6 breaks) in a conventional mill. However, each grinding process produces fine bran particles (bran powder) and germ particles which have a tendency to be separated with the endosperm and are difficult if not impossible to remove from the endosperm. Each grinding operation produces more and more bran powder, compounding the problem.

Effective removal of the bran from the endosperm (flour and semolina) remains a problem affecting the yield possible from given wheat kernels as well as the fixed capital cost of a mill and the variable costs for milling high grade patent flour, and/or semolina.

The bran that is removed is utilized primarily for animal feed.

SUMMARY OF THE INVENTION

According to the present invention bran by-product fractions are recovered as wheat kernels are pre-processed to effectively remove the bran coat layers sequentially by passing them through various friction operations followed by abrasion operations which peel, strip or otherwise remove the bran layers from the wheat kernels while the endosperm remains essentially integral.

In contrast to the conventional practice, the wheat kernels, processed according to the present process, are not subjected to tempering initially, as this would fuse the various bran layers. The kernels are processed to effectively strip these bran layers from the endosperm prior to tempering of the wheat kernels.

The initial four layers of the bran coat are removed preferably by initially conditioning the outer bran layers with a small amount of water, normally 1 to 3% by weight. This water does not fuse the entire bran coat, but merely serves to loosen the outer layers. Timing between applying the water and stripping the layers is important and the wheat kernels are processed essentially immediately, within 60 minutes, preferably within 5 minutes, in contrast to the required several to many hours for tempering. The conditioned kernels are fed to a series of friction machines to remove the outer bran layers. The friction operations for stripping of the bran layers, in some cases, can be enhanced by fogging of the wheat kernels prior to processing in the friction operation. Fogging of the kernels is not to be confused with a tempering operation. Tempering fuses the various bran layers such that sequential removal of the individual layers is not possible, fogging only adds enough moisture to enhance separation of the layers.

Abrasive operations follow the fraction operations and are required to remove the inner bran layers, namely the seed coat, nucellar (hyaline) layer and aleurone layers. Both the nucellar layer and aleurone layer tend to polish in friction operations. It should be recognized that the above process for sequentially removing the bran layers will not be 100 percent effective, however the pre-processed kernels will have most of the exposed bran coat removed and as such, the difficulties with respect to bran contamination and separation of the various desired components of the wheat kernel is greatly reduced. This allows the downstream processes of conventional milling to be simplified and/or more effective. All the bran coat is not removed by the present process as the bran within the crease, for the most part, remains intact. A further advantage is that the friction and abrasion operations can be adjusted to strip and separate the various layers of the bran coat. Each layer or group of layers has unique properties and can be processed to produce a product of increased value.

In addition preprocessing the kernels removes the bran layers including the seed coat prior to milling thereby improving the colour and appearance of the milled products: flour or semolina.

The bran by-products removed during the abrasion operations, namely the seed coat, nucellar (hyaline)

layer and aleurone layer have a significantly higher protein content than bran recovered during conventional milling operations. These bran by-products can be potentially used as ingredients in breakfast cereals, binders, breads and snack foods, premium feeds and rusk thereby resulting in value added products for the mill.

BRIEF DESCRIPTION OF THE PREFERRED EMBODIMENTS

Preferred embodiments of the invention as shown in the drawings wherein.

DETAILED DESCRIPTION OF THE PREFERRED EMBODIMENTS

Figure 2:
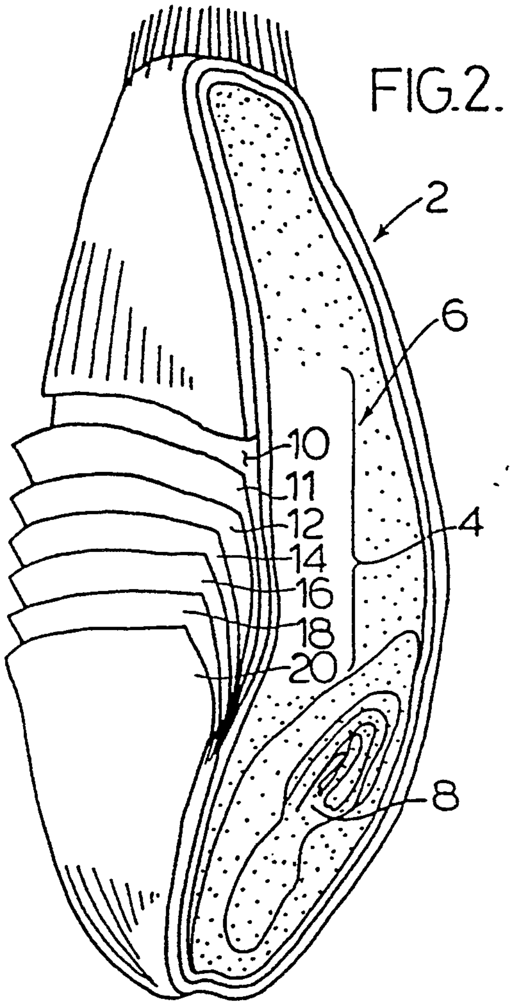
FIG. 2 is a perspective view of the wheat kernel with a portion of the bran layers cut away.
Figure 3:
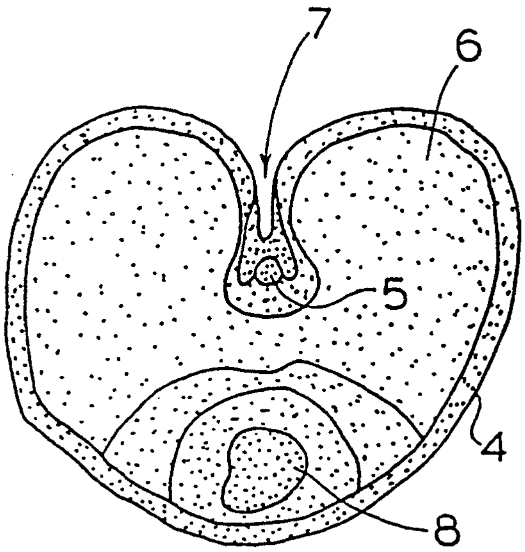
FIG. 3 is a cross-section taken through a wheat kernel.

The wheat kernel 2, generally shown in FIGS. 2 and 3, has a bran coat 4 made up of several different layers identified at 10 through 20. Interior to the bran coat is the endosperm 6 with the wheat germ generally identified as 8. In general, the bran layers collectively make up about 15% by weight of the wheat kernel, whereas the germ represents about 2.5% and the endosperm represents about 83% by weight of the wheat kernel.

The layers of bran from the outer to inner layer are:

epidermis 20
hypodermis 18
cross cells 16
tube cells 14
seed coat 12
nucellar tissue (hyaline layer) 11
aleurone cells 10

In the cross-section of FIG. 3, a portion 5 of the seed coat 12 is located within the crease 7 of the wheat kernel 2. It should be noted that the bran layers do extend within the crease 7 and this bran is left substantially intact by the present invention to be removed subsequently by conventional milling techniques.

The aleurone layer 10 is quite thick and acts as a tolerance zone for the last abrasion operation. It is desirable to leave some of the aleurone layer 10 to ensure the maximum amount of endosperm is processed to maximize the yield. In general, if the bran layers removed during the operation of the present invention equal about 19% by weight of the initial feed, most of the aleurone layer will have been removed from the wheat kernels.

The wheat kernel 2 generally shown in FIG. 2 is illustrated with the various layers of the bran partially peeled on the left side of the kernel and, the present process, seeks to peel away or remove these layers. It has been found that the use of a series of friction operations followed by a series of abrasion operations applied to the kernels prior to the tempering of the kernels will allow various layers of the bran coat 4 to be sequentially removed and separated from the wheat kernels. It is not essential that each layer be removed independently of an underlying layer and, in fact, the operations are such that two or more layers are removed or partially removed at the same time. In effectively stripping or peeling of these layers from the wheat kernels, some of the underlying layer may also separate and therefore, although the operation as described with respect to the flow chart of FIG. 1 discusses removal of particular layers, some portions of other layers may also be removed.

Figure 1:
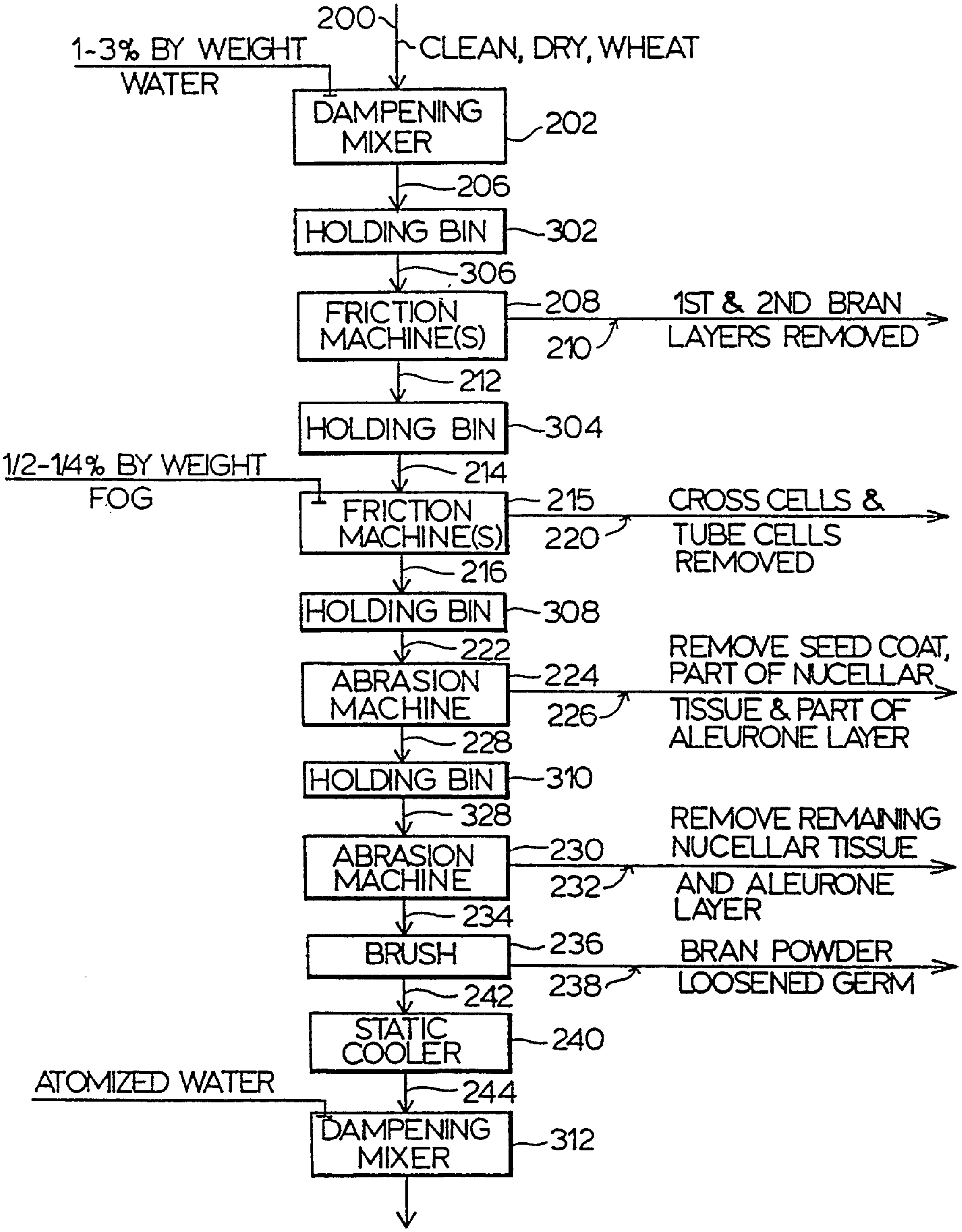
FIG. 1 is a flow chart showing the various steps of the present invention.

The process for removing the bran layers is generally showing in FIG. 1. This process is upstream of the traditional milling process and, in particular, in advance of the tempering of the wheat kernels. Traditional steps for removing debris, dirt, etc. have already been completed. The process begins by placing clean, dry wheat kernels indicated as 200 into a dampening mixer 202 and adding water in an amount equalling about 1-3% by weight of the kernels. The amount of water added depends on the initial moisture of the wheat and the hardness of the wheat. In general hard wheat will require more water to be added than soft wheat varieties. The mixer 202 serves to ensure uniform distribution of moisture to the kernels and the outer layers of the bran coat effectively absorb most of the water. The water penetrates to about the nucellar tissue layer 11 which repels the water to a certain extent, due to its higher fat content. The repelled water serves to part the layers to assist in removal by friction. The kernels are moved through the dampening mixer 202 in about one minute and delivered, as indicated by line 206, to a holding bin 302 in advance of the first friction operation. The holding bin 302 permits adequate supply of wheat is available to be processed in the subsequent process steps. In addition hold time in the bin 302 can be adjusted to permit the moisture time to penetrate the bran layers. The penetration time varies from variety to variety depending on, among other factors, the hardness of the wheat. Insufficient penetration results in difficulty in removing the bran layers and too much penetration results in too many layers being removed at one time and an increase in power consumption. The kernels are moved from the holding bin 302 preferably within one to five minutes to friction,machine 208 which brings the kernels into friction contact with one another as well as friction contact with the machine or various moving surfaces of the machine. The movement of the kernels from the dampening mixer 202 to the holding bin 302 is indicated by arrow 206 and from the holding bin to the friction machine by arrow 306. The friction machine 208 effectively strips the outer bran layers, namely the epidermis 20, the hypodermis 18, and some of the cross cells 16. These layers are removed from or separated from the remaining kernels and are discharged from the friction machine along the line indicated as 210. A second holding bin 304 is provided for the wheat kernels exiting the first friction machine to ensure a continuous flow to the second friction operation and to provide the kernels with a short term relaxation. The partially processed kernels are then transported, as indicated by line 214, to a second friction machine 215 which removes the remaining Cross cells 16, the tube cells 14 and in some wheat varieties part of the seed coat 12. It has been determined that fogging of the kernels using about $\frac{1}{4}\%$ to $\frac{1}{2}\%$ by weight of atomized water can be introduced in the second friction operation 215 to loosen and assist in separating the layers being removed. The removed layers are separated from the kernels as indicated by line 220, with the processed kernels being passed to a third holding bin 308 as indicated by line 216. Holding time in bin 308 is sufficient to permit relaxation of the wheat kernels prior to commencing abrasion.

The kernels are then moved from holding bin 308, as indicated by line 222, to the first abrasion operation 224. abrasion machine 224 removes most of the seed coat 12 and some of the nucellar tissue 11 and the aleurone cells 10 which are discharged as indicated by line 226. The stripped kernels are passed, as indicated by line 228, to holding bin 310. The kernels are then fed, as indicated by line 320, to a second abrasion machine 230 which removes most of the remaining seed coat, nucellar tissue and aleurone layer. The separated layers are removed as indicated by line 232.

The bran layers removed during each operation are collected and separately processed or stored. For example the particles removed during the first fraction operation and the second friction operation are collected and delivered through an expansion chamber to separate any breakage add germ from the removed bran layers. The removed bran layers are delivered to filter receivers from which the product is discharged to a collecting system for storage. It has been determined that the first four layers of the bran are high in dietary fibre and relatively low in phytate phosphorous. Phytate phosphorous has been shown in some studies to inhibit mineral absorption in the human body and accordingly low phytate phosphorous levels in dietary fibre products which can be used as fibre additives in other foods may be desirable. For this reason the first and second friction operations can be adjusted to minimize the removal of the seed coat, nucellar tissue or aleurone layers which have higher phytate phosphorous levels.

After the second abrasion operation the bran coat has been substantially removed from the wheat kernels other than in the crease area and the preprocessed kernels are moved, as indicated by line 234, to the brushing apparatus indicated as 236. The brushing operation removes bran powder from the crease of the wheat kernels and serves to loosen the germ. Bran powder and loosened germ are removed as indicated by line 238. The resulting kernel, which no is essentially the endosperm, crease bran and germ is fed from the brush 236 to a static cooler 240 to cool the wheat to about 70°–90° F. Heat generated during the friction and abrasion operations unless otherwise dissipated, may result in the temperature of the wheat being in excess of 90° F. upon exit from the last abrasion operation. Temperatures in excess of 90° F. are undesirable in order to mill the preprocessed kernels. As an alternative to the static cooler 240 other methods of maintaining the temperature of the wheat at acceptable levels can be utilized so long as the wheat delivered to the tempering bins is between 70°–90° F. The kernels which leave the static cooler 240 as indicated by line 244 may now be conditioned by adding moisture in a second dampening mixer 312 to bring the moisture level in the wheat kernels up in order that the endosperm is properly mellowed for milling and to toughen and fuse the remaining bran in the crease. The time for conditioning the wheat end fusing the bran in the crease can take substantially less time and less grinding, separating and purifying steps will be required to achieve the same or a higher degree of extraction and purity in milling than achieved using current techniques.

According to the process of the invention the endosperm remains integral during removal of the bran coat. The preprocessing steps are carried out before tempering of the kernels which would have fused the bran layers and mellowed the endosperm. The non-tempered endosperm is somewhat hard and acts as an interior support during the friction and abrasion operations.

Although two friction machines are shown and two abrasion machines are shown for separating the various bran layers, some of these operations can be combined if a lesser degree of separation of individual bran layers is desired or more machines may be provided if greater control is warranted. In addition both horizontal and vertical machines are suitable for use with the present invention.

The friction machines suitable for operation of the present invention preferably use the friction of individual gains rubbing against each other to peel the bran layers away.

Figure 4:
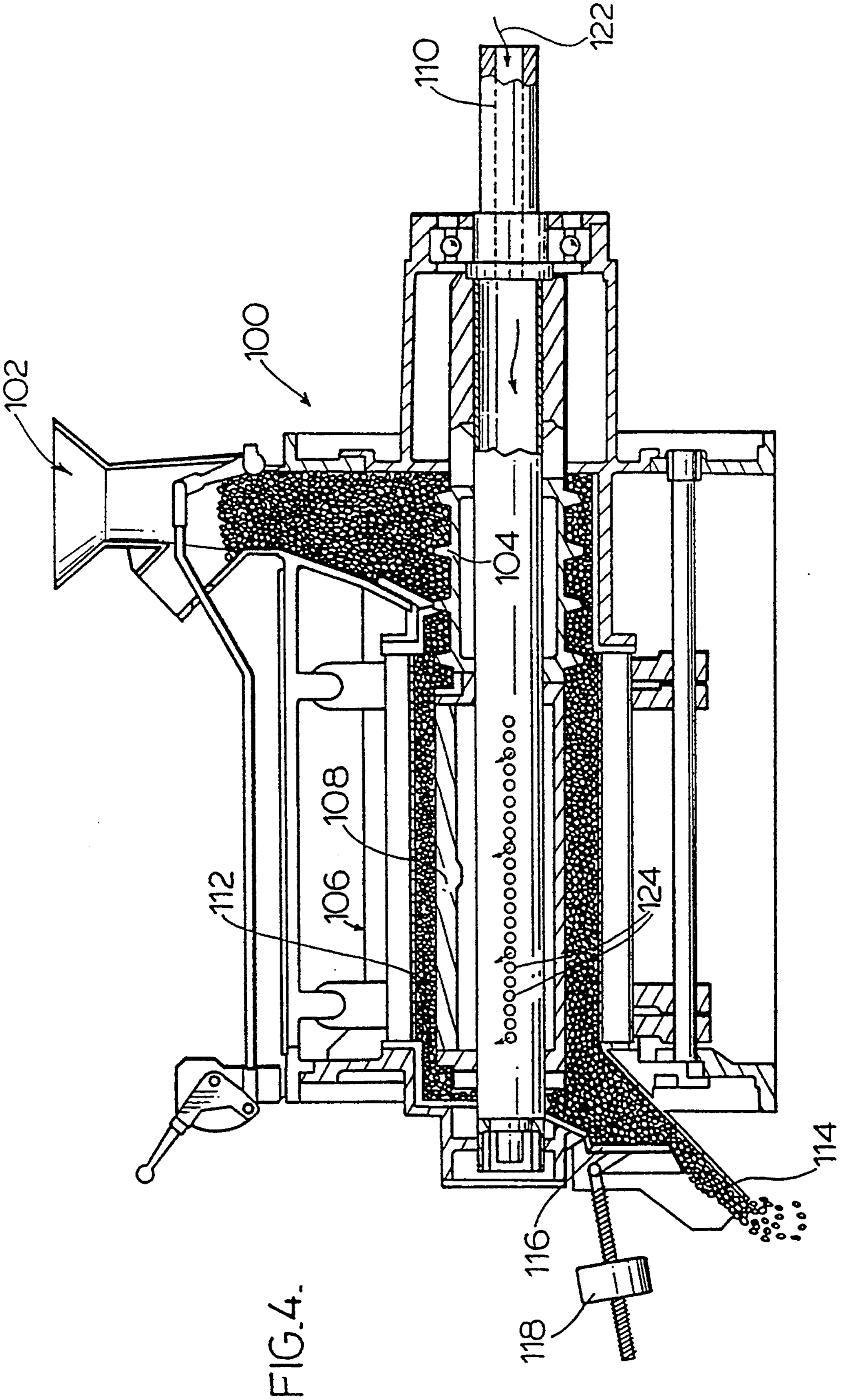
FIG. 4 is a sectional view of a friction machine.
Figure 5:
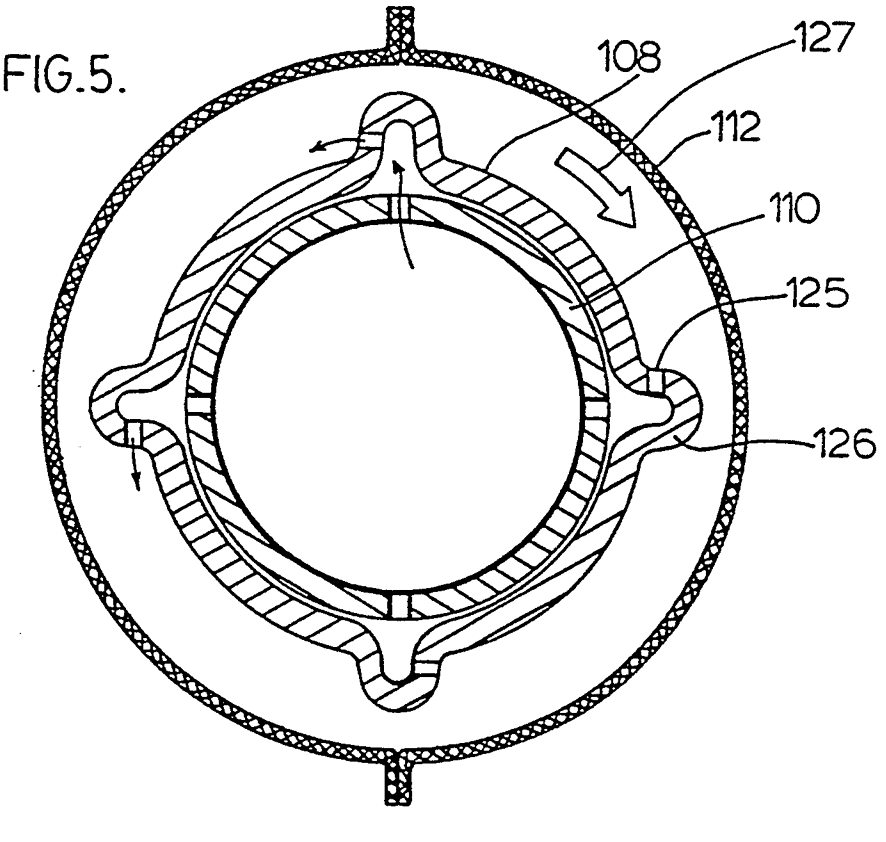
FIG. 5 is a cross-section of the milling chamber of the friction machine of FIG. 4.

One friction-type machine for removing bran layers is shown in FIGS. 4 and 5 has a hopper 102 for receiving the wheat kernels to be processed. The received wheat kernels are advanced by the screw feed 104 along the axis of the machine to a bran removing section 106. A milling roller 108 is provided and consists of a vaned hollow shaft carried on a hollow drive shaft 110. The rotation of the milling roller 108 causes the wheat kernels to be in friction contact with each other or friction contact with the milling roller 108 or outer screen 112. In friction machine 100, the wheat kernels remain in contact with each other throughout the bran removing section 106. The milling roller 108 causes the kernels to move rotationally about its axis as they are advanced through the length of the machine. The wheat kernels are discharged from the machine at the discharge chute 114 having a control member 116. The control member 116. The control member 116 is adjusted by the lever and weight arrangement 118. By increasing or decreasing the force exerted on said control member 116 by means of the lever and weight arrangement 118, a greater or lesser back pressure can be created and this allows control of the amount of bran removed as it is processed through the machine. the milling roller 108 cooperates with the outwardly disposed screen 112 which is appropriately sized to allow removed bran to pass therethrough. The width and angle of the slots in the screen also control the amount of bran removal. To encourage bran to pass through the screen 112, air is introduced through the drive shaft 110 at 122. The drive shaft 110 has vent holes 124 along its length which permit the air to pass into the space between the drive shaft 110 and the milling roller 108. Slots 125 are provided in the vanes 126 of the milling roller 108 and the air passes through these slots 125 and makes its way through the wheat kernels carrying removed bran to and through the screen 112. The bran is collected and suitably discharged from the machine.

Figure 6:
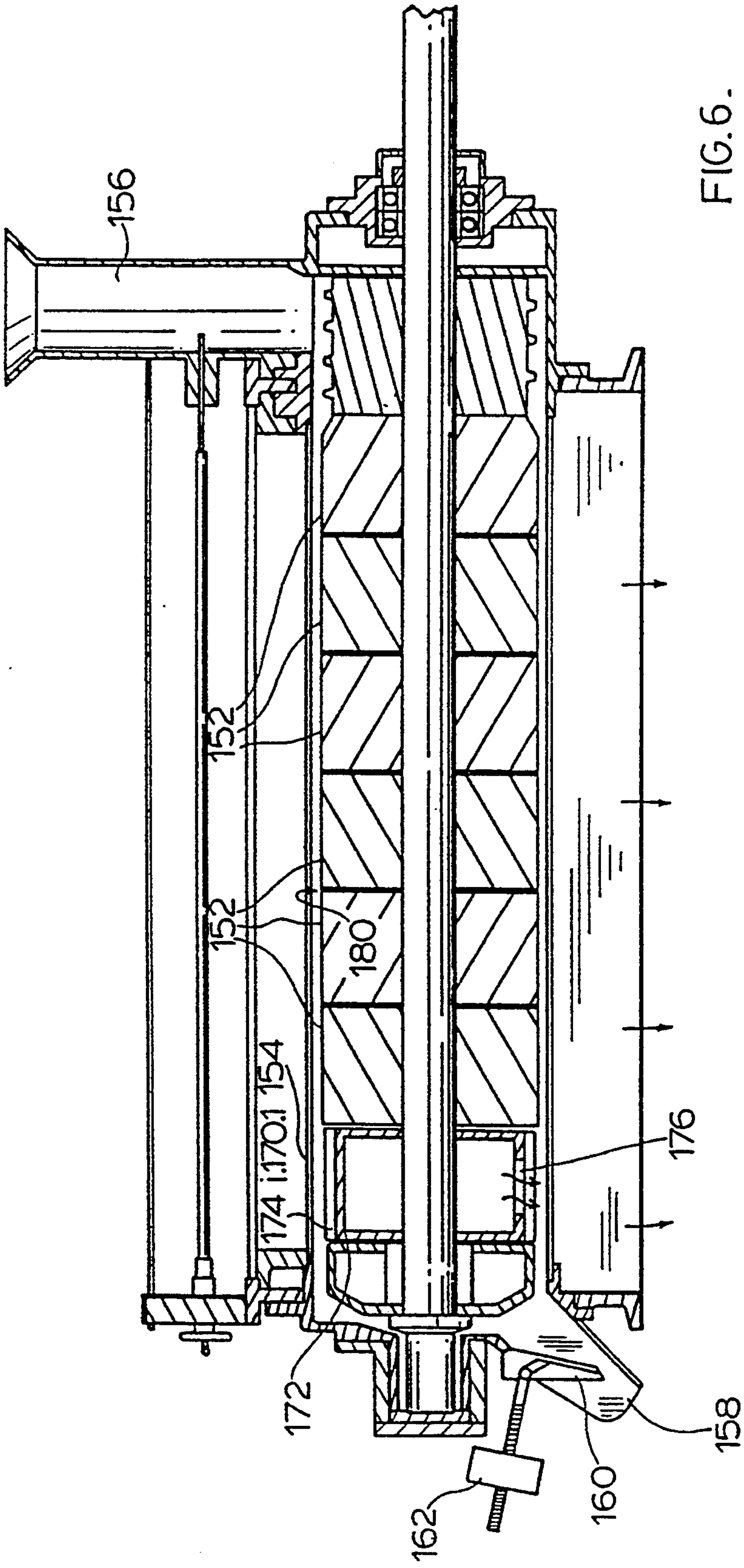
FIG. 6 is a sectional view of an abrasion machine.
Figure 7:
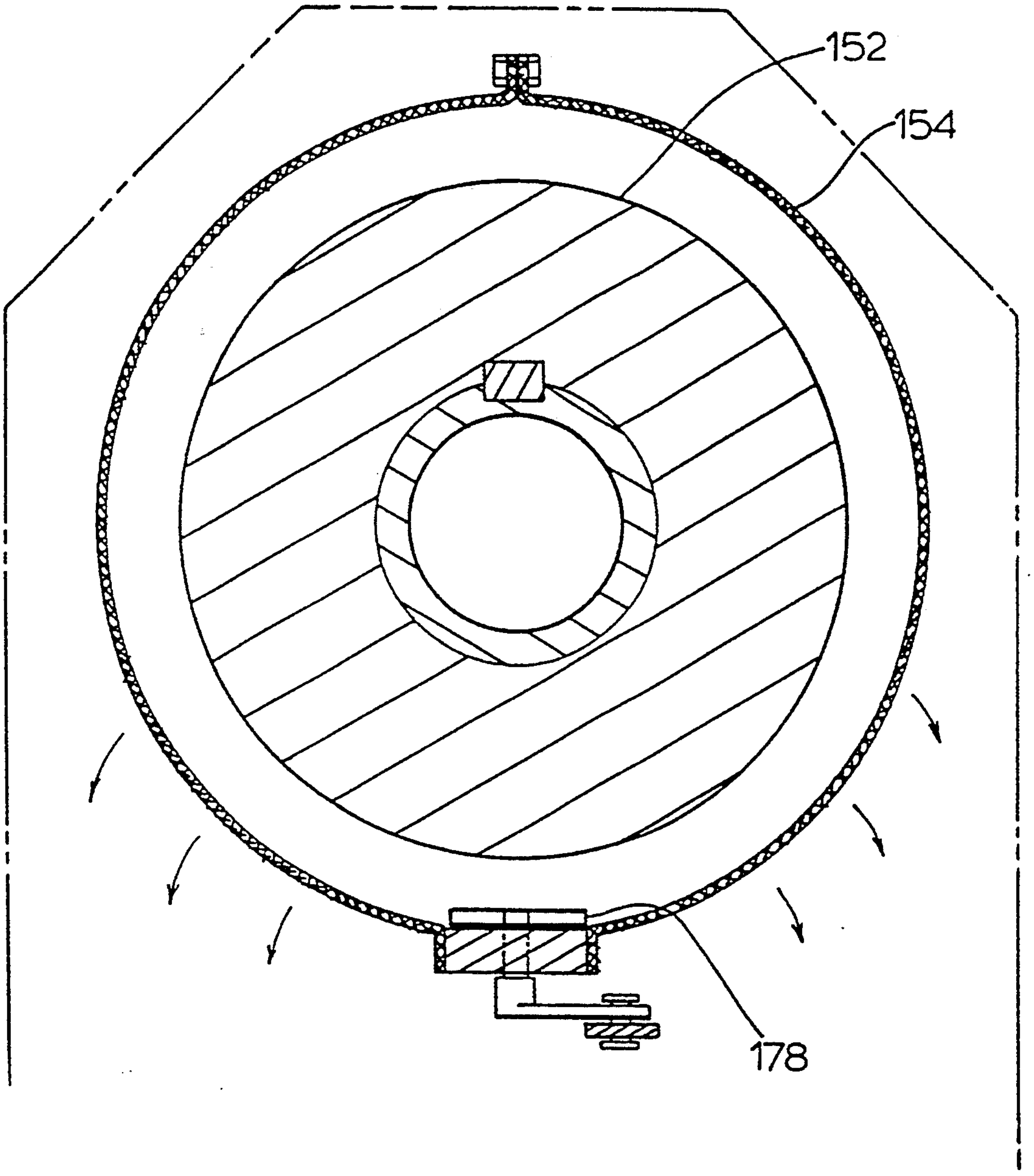
FIG. 7 is a cross-section of the milling chamber of the abrasion machine of FIG. 6.
Figure 8:
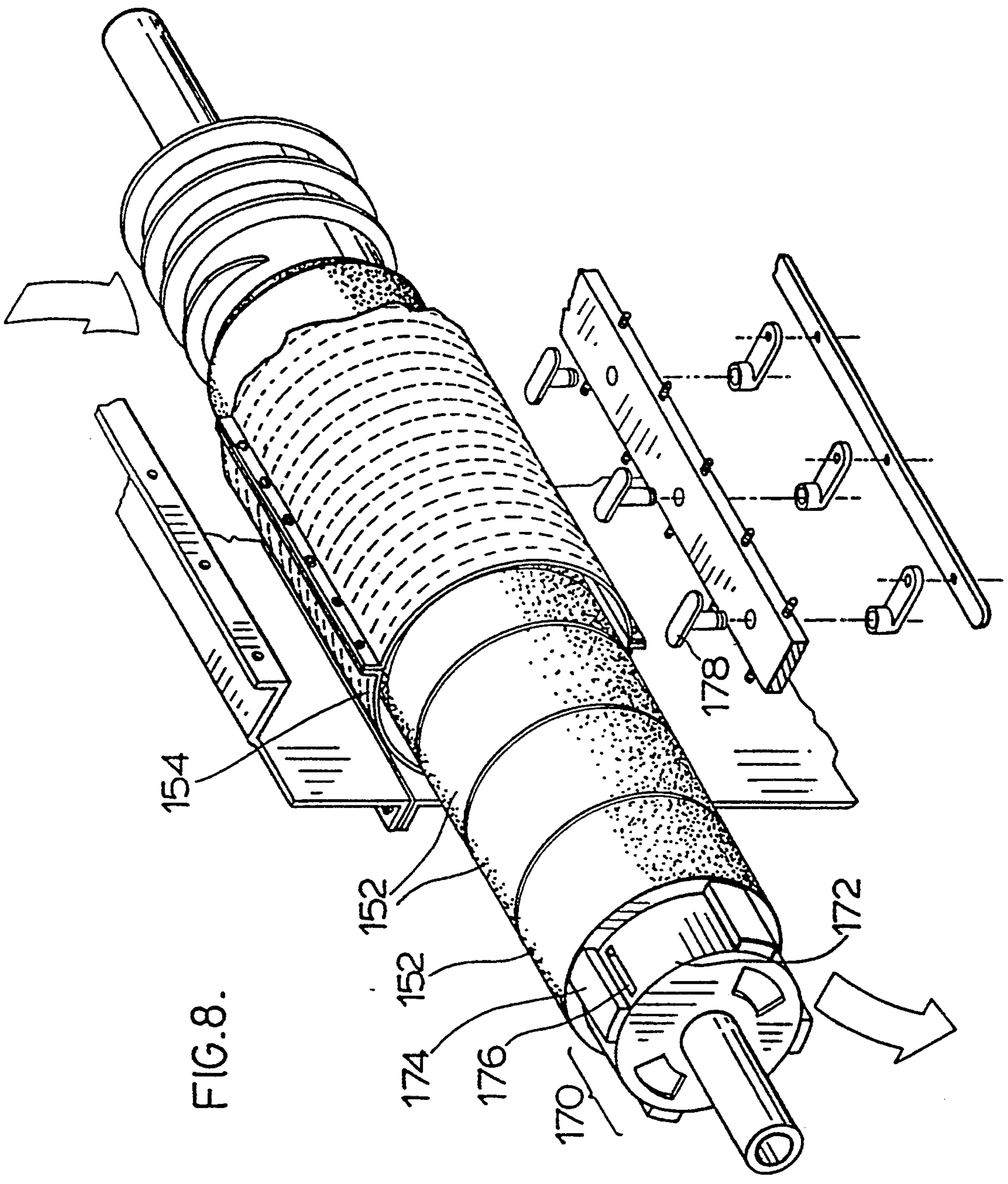
FIG. 8 is a perspective view of the abrasive roll and co-operating components of the abrasive machine of FIG. 6.

The milling roller 108 and screen 112 are schematically shown in vertical cross-section in FIG. 5. The arrow 127 indicates the direction of rotation of the milling roller 108, The abrasion machine 150 of FIGS. 6, 7 and 8 uses a series of an abrasive stones 152 which cooperate with an outer concentrically disposed slotted steel screen 154.

The machine includes an intake hopper 156 for receiving the partially processed wheat kernels, and the processed kernels are discharged at chute 158. The abrasive stones cut the bran layers from the surface of the wheat kernels as they come into contact with them, The series of abrasive stones 152 is followed by a short friction or polishing section 170 whose primary function is to remove loose bran generated by the abrasive stones 152. This friction section 170 consists of a smooth hollow steel roll 172 to which resistance bars 174 are attached and in which there are a series of slots 176. The slots 176 permit high pressure air fed to the smooth hollow steel roll 172 to pass into the cavity between the steel roll 172, stones 152 and screen 154 and help facilitate the transfer of removed bran through the screen as well as acting to control the temperature of the wheat kernels and the stones 152. The abrasion machine 150 is also provided with a series of adjustable resistance pieces 178 along the bottom of the milling chamber 180 which can affect the pressure on the wheat kernels within the milling chamber 180. Control member 160 varies the opening pressure of the discharge chute to thereby vary the back pressure. Adjustment is made by means of the lever arm and weight arrangement 162. As noted above, air under pressure is introduced into the discharge end of the abrasion machine and is axially discharged through the steel roll 172 to cool the wheat kernels and urge removed bran layers to pass through the slotted steel screen 154. The air also serves to clean the kernels of small bran particles. The removed bran layers pass through the slotted steel screen 154 are collected and discharged separately. If moisture is added in the abrasion machine it has been found that there is a tendency for the abrasive stones to become fouled.

Both friction and abrasion machines preferably can be adjusted to provide satisfactory control of the bran layers removed. Irregardless of the size of the kernels and so that there is no free movement of kernels to avoid breakage. Total control of the bran layers removed n each step is not required, however effective control of each operation can increase the yield by assuring the endosperm remains essentially intact.

In both the friction and abrasion machines there are several factors which can be used to control the bran removal at any stage of the process:

(a) Pressure within the Bran Removal Chamber (i) The pressure within the bran removal chamber of both the friction and abrasion machines is controlled by adjusting the magnitude or position of the weights on the lever arms located at the discharge of the machine. The greater the weight placed on the lever or the further out on the lever the weight is placed the greater the pressure in the bran removal chamber and the more bran layers removed;

(ii) Variable Resistance Pieces

In the abrasion machine the angle of the resistance pieces at the bottom of the milling chamber to the wheat flow can be adjusted to increase or decrease the pressure. This is the primary adjustment in the abrasion type machine. The greater the angle the more bran removed.

(b) Screen Configuration

In both the abrasion and friction machines, the width of the slot in the screen and the angle of the slot with respect to the longitudinal axis of the machine affect the degree of bran removal. In general, the wider the slot and the greater the angle of the slot, the greater the bran removal. It is important not to increase slot width so that broken bits or whole grains can pass through the slot.

(c) Grit of Abrasive Stones

Generally the smaller the mesh or grit number of abrasive stone, the more bran removal is obtained. In addition, the hardness of the stones impacts on bran removal. Soft stones will result in greater bran removal, however soft stones wear more rapidly than hard grit stones. Also, the smaller grit number stones (coarse) result in a rougher finish on the kernels.

(d) Speed of Rotation

The faster the speed of rotation of the milling roll the more bran removed.

Both friction and abrasion machines utilize the endosperm as an internal support for stripping the bran from the kernels. This approach is in direct contradiction to the use of grinding apparatus in the conventional process which not only breaks the fused bran coat, but also breaks the endosperm. This results in a host of fragments of bran, germ and endosperm which essentially must be commonly processed in an effort to efficiently separate the endosperm from the bran. This is a very difficult problem as it requires further grinding or breaking of the fragments, which in turn creates more bran powder which is extremely difficult to remove from the powdered endosperm.

These problems are substantially reduced with the present process since approximately 75% of the bran has been removed.

In the milling of certain high fibre flour, some of the removed bran layers may be added back after the endosperm has been milled into flour. This will allow a greater degree of accuracy with respect to the actual type of fibres in the flour and the amount thereof.

The present process, if desired, could be completed as a separate step and the processed kernels stored for later milling. Also, the processed kernels can be reintroduced to any of the friction and abrasion operations if for some reason they are not satisfactorily processed. These advantages of partially processing the kernels and/or the ability to reprocess material add flexibility in a system which previously was essentially inflexible.

The process as generally indicated in FIG. 1 is designed to allow separation of the bran layers in a sequential manner where the separated bran layers, if desired, can be used for specialized products. This separation cannot be accomplished with the conventional process in that the bran layers have been fused. By sequentially removing and separating the bran layers, more specialized and profitable products can be produced. Therefore, not only is the separating of the bran layers important with respect to milling of the endosperm, it is also important as valuable by-products are created. Advantages of the present process and apparatus include:

a) Purer/cleaner flour and semolina as bran and/or germ contamination has been reduced;
b) Reduced capital expense as the number of grinding, separating and purifying steps are reduced;
c) Opportunity to increase throughput of existing mill using preprocessed kernels;
d) Higher endosperm extraction rates;
e) Reduced process steps for given yield;
f) Reduced technical skills for carrying out the process; and
g) Substantially increased flexibility in processing the kernels to improve extraction rate by adjusting preprocessing equipment and/or repeating certain preprocess steps.

Figure 9:
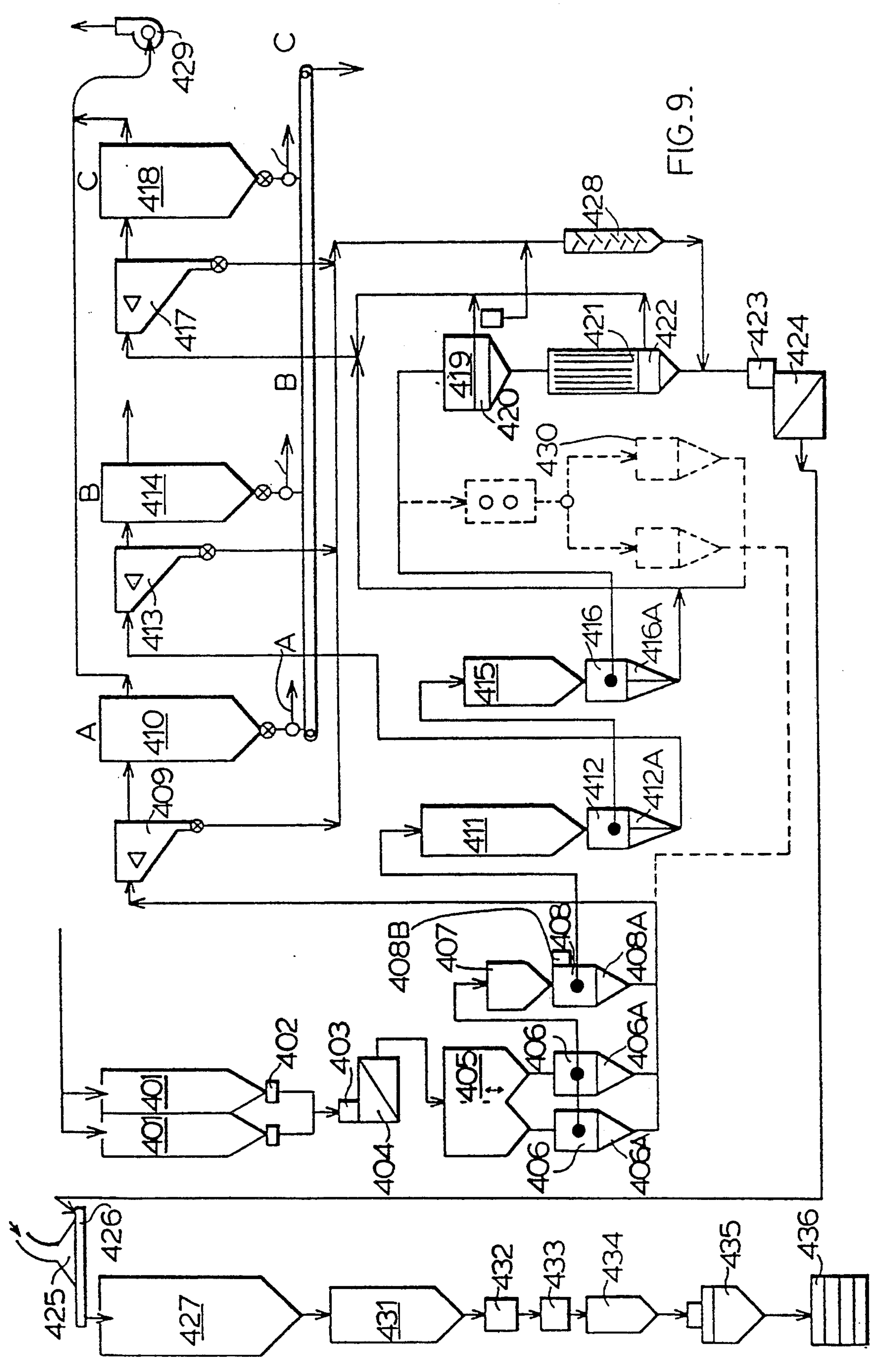
FIG. 9 is a flow sheet showing a preferred embodiment of the apparatus of the present invention.

In the flow diagram shown in FIG. 9, clean dry wheat from the cleaning house is fed to storage bins 401. The wheat is subsequently fed through wheat measures 402 to set the load through the system. The wheat is fed from measures 402 to a technovator mixer 404 at which time 1-3% atomized water is added. The amount of atomized water added is controlled by air and water controls 403.

The wheat is then conveyed to holding bin 405 with level controls to control penetration time and to shut down the system if there is any interference in the flow to or through the friction machines.

The wheat is fed to two friction machines 406 each operated by a 40 hp motor running at 750 RPM. The removed bran, germ and broken bits are collected in hopper 406A and carried on a stream of air to expansion chamber 409 where the broken bits and germ are separated from the removed bran layers. The air and removed bran stream is passed to filter receiver 410 where the removed bran (Product A) is separated from the air and collected separately or collected with Products B and C and conveyed to a sifter for grading, grinding and storage.

The wheat discharged from friction machines 406 is fed to holding bin 407 and then conveyed to friction machine 408 operated by a 50 hp motor at 750 RPM. Atomized water (about $\frac{1}{4}$-$\frac{1}{2}$%) is added to the wheat upon being fed to the friction machine 408 by control 408B. The removed bran, germ and broken bits are collected in hopper 408A and collected with the removed bran, germ and broken bits from friction machines 406 and handled in the same way.

The wheat exiting friction machine 408 is conveyed to holding bin 411. There is a 10-15 minute holding capacity in bin 411 for relaxation and load control prior to the abrasion operation. The wheat is then fed to abrasion machine 412, operated by a 60 hp motor at 942 RPM, which has a split hopper 412A to collect the removed bran layers, germ and broken bits. These removed bran layers, germ and broken bits ere conveyed through expansion cheer 413 where the broken bits and germ are separated from the air stream. The air and bran are passed to filter receiver 414 for separation of the removed bran from the air stream. This removed bran can be collected as Product B or collected together with a Product A and Product C and fed to a sifter for grinding, grading and storage. The wheat exiting abrasion machine 412 is delivered to holding bin 415 with a 5 minute holding capacity for relaxation and load control. The wheat is then fed to abrasion machine 416 operated by a 60 hp motor at 942 RPM. The removed bran, germ and broken bits are collected in split hopper 416A passed through expansion chamber 417 to remove the broken bits and germ and then to filter unit 418 for removal and handling of the bran as Product C in a similar fashion as the bran products removed from filter units 410 and 414.

The wheat exiting abrasion machine 416 is fed to wheat brush 419 to remove crease bran powder and loosen the germ. Aspiration chamber 420 in the wheat brush 419 removes dust and separates any broken bits and germ.

The wheat is then delivered to a static cooler 421 (cold water radiators) to cool the wheat. Aspiration chamber 422 in static cooler 421 removes any loose dirt and assists in the cooling of the wheat.

The broken bits, germ and bran powder from aspiration chambers 420 and 422 are collected and delivered to the stream of removed products exiting abrasion machine 416 prior to delivery to expansion chamber 417.

The main stream of wheat from the static cooler 421 is fed to a technovater mixer 424 where additional atomized water (1-4% by weight) is added to mellow the endosperm and fuse the remaining bran in the crease. The addition of moisture is controlled by control 423.

The wheat exiting the technovater 424 is delivered to a mixing distribution conveyor 426 to deliver the dampened wheat to temper bins 427. A cooling hood 425 is placed over the mixing distribution conveyor for passing cooler air over the wheat to assist in cooling the wheat down to about 70° to 90° F.

From the temper bins 427 the wheat is drawn to holding bin 431 and then through magnet 432, wheat measure 433 and wheat scale 434. The wheat then is fed to a pre-break machine 435 to pre-break the wheat and to loosen the germ. The broken wheat is then delivered to pre-break sifter 436 to remove the germ and separate the broken wheat into stock sizes for delivery to either the break rolls, germ sizing system, purifier or a finished product collection system.

The broken bits and germ removed from expansion chambers 409, 413 and 417 and aspiration chamber 420 and 422 are collected together and passed through aspirator 428 to remove any fine dust from the broken bits and germ. The product exiting aspirator 428 is then joined to the main stream of wheat prior to delivery to technovator 424. Alternatively the broken bits and germ could be tempered separately and introduced to the germ sizing system.

Prior to delivery to brush 419, the wheat can be optionally delivered to additional friction or abrasion machines 430 for additional processing if desired.

Suction fan 429 provides the air requirements of the system for aspiration, cooling and conveying of the by-products from the friction and abrasion machines. The fan also provides suction to aspirate (remove heat) from the mechanical conveying equipment i.e. elevator legs, hoppers and conveyors.

While protein content of bran millfeeds will vary from variety to variety and crop to crop, in general protein will be between 13% to 15% (based on 14% moisture). However by preprocessing the wheat prior to tempering, it is possible to recover by-product fractions consisting of the seed coat, nucellar and aleurone layers with significantly higher protein levels making them particularly suitable for sale as value added products.

The attached Tables 1-10 show the analysis of various varieties of by-product fractions and wheat fractions where the protein content of Products B and C recovered during the debranning process were in the range of about 18% to almost 30% (consistently 20%-25%) measured on a dry basis. This is a significant increase over bran recovered in conventional milling whether rollermills, hammer mills or pin mills are used. The trials for which the results are set out in the Tables were conducted An accordance with the de-branning process illustrated in FIG. 9 using both vertical and horizontal friction and abrasion machines.

TABLE 1

Comparison of Percent Protein And Fat in Various By-Product Fractions of Different Debranning Trials.

| | (1) 3 CW % P = 17.85 | | (2) CWRS % P = 17.81 | | (3) Durum % P = 17.76 | | (4) 1 CWRS % P = 19.52 | | (5) English Hard % P = 14.82 | |
|---|---|---|---|---|---|---|---|---|---|---|
| FRACTIONS | % Protein | % Fat | % Protein | % Fat | % Protein | % Fat | % Protein | % Fat | % Protein | % Fat |
| 1st Friction | | | 12.61 | 1.17 | 12.08 | 2.76 | | | | |
| 2nd Friction | | | 15.22 | 2.11 | 15.21 | 5.09 | | | | |
| A | 5.21 | 0.82 | | | | | 9.54 | 1.82 | 8.69 | 1.43 |
| 1st Abrasion B | 22.34 | 7.60 | 20.40 | 5.58 | 22.67 | 10.85 | 23.59 | 8.01 | 23.93 | 8.21 |
| Fines Thru 9N | 26.15 | 8.19 | 23.27 | 6.31 | 23.08 | 12.34 | 24.94 | 8.48 | 24.52 | 8.91 |
| Coarse Ovr 9N | N/A | N/A | 18.78 | 4.32 | 22.07 | 10.27 | 20.26 | 7.64 | 21.53 | 8.21 |
| 2nd Abrasion C | 27.73 | 6.58 | 19.09 | 5.40 | 23.52 | 11.29 | 28.88 | 7.00 | 24.54 | 6.00 |
| Fines Thru 9N | 29.23 | 6.12 | 21.86 | 6.31 | 24.14 | 14.66 | 28.85 | 7.02 | 23.92 | 6.03 |
| Coarse Ovr 9N | N/A | N/A | 18.24 | 4.36 | 23.41 | 12.19 | 23.40 | 7.89 | 22.08 | 5.95 |

All values on Dry Basis
Protein = N × 5.7

TABLE 2

AMBER DURUM WHEAT FRACTIONS DEBRANNED

| WHEAT AND | TEST 1 | | | TEST 2 | | | TEST 3 | | |
|---|---|---|---|---|---|---|---|---|---|
| FRACTIONS | MOIST % | PROT % | ASH % | MOIST % | PROT % | ASH % | MOIST % | PROT % | ASH % |
| INLET | 12.1 | 17.18 | 1.79 | — | — | — | — | — | — |
| 1a FRICTION | 21.2 | 14.21 | 4.65 | 14.9 | 17.34 | 4.04 | 22.4 | 13.63 | 4.13 |
| 2a FRICTION | 16.4 | 19.43 | 4.96 | 13.6 | 18.34 | 4.11 | 21.8 | 11.15 | 3.70 |
| 1a ABRASION | 13.7 | 21.01 | 3.46 | 12.9 | 21.41 | 4.02 | 13.8 | 23.24 | 5.48 |
| 2a ABRASION | 13.2 | 20.45 | 3.20 | 12.0 | 19.86 | 2.94 | 12.4 | 20.84 | 4.14 |
| 3a ABRASION | 11.6 | 18.50 | 1.55 | 11.7 | 18.38 | 2.49 | 11.5 | 18.88 | 2.74 |
| PROCESSED WHEAT | 12.2 | 15.69 | 0.71 | 12.6 | 16.00 | 0.81 | 12.4 | 16.24 | 1.00 |

| WHEAT AND | TEST 4 | | | TEST 5 | | | TEST 6 | | |
|---|---|---|---|---|---|---|---|---|---|
| FRACTIONS | MOIST % | PROT % | ASH % | MOIST % | PROT % | ASH % | MOIST % | PROT % | ASH % |
| INLET | — | — | — | — | — | — | — | — | — |
| 1a FRICTION | 23.0 | 14.06 | 4.35 | 19.4 | 16.92 | 5.11 | 17.4 | 18.75 | 4.47 |
| 2a FRICTION | 20.1 | 13.58 | 3.92 | 16.0 | 16.10 | 3.76 | 15.5 | 17.09 | 3.60 |
| 1a ABRASION | 13.6 | 19.36 | 5.81 | 15.4 | 22.48 | 5.72 | 13.8 | 21.96 | 5.26 |
| 2a ABRASION | 12.2 | 24.13 | 6.37 | 12.3 | 23.34 | 5.75 | 12.2 | 23.06 | 5.80 |
| 3a ABRASION | 11.5 | 25.83 | 6.23 | 11.6 | 21.86 | 4.88 | 11.6 | 22.06 | 4.94 |
| PROCESSED WHEAT | 12.5 | 17.41 | 1.47 | 12.4 | 16.76 | 1.15 | 12.5 | 16.37 | 1.14 |

TABLE 3

RED SPRING (TESTS 7 AND 8) AND SOFT WHITE SPRING (TEST 9) WHEAT FRACTIONS

| | RED SPRING | | | | | | SOFT WHITE SPRING | | |
|---|---|---|---|---|---|---|---|---|---|
| WHEAT AND | TEST 7 | | | TEST 8 | | | TEST 9 | | |
| FRACTIONS | MOIST % | PROT % | ASH % | MOIST % | PROT % | ASH % | MOIST % | PROT % | ASH % |
| INLET | — | — | — | 12.7 | 16.31 | 1.90 | 12.7 | 14.12 | 2.00 |
| 1a FRICTION | 22.4 | 13.80 | 3.92 | 19.9 | 15.51 | 3.70 | 16.8 | 14.45 | 3.13 |
| 2a FRICTION | 17.5 | 13.50 | 3.34 | 16.0 | 15.60 | 3.46 | 14.1 | 15.02 | 2.83 |
| 1a ABRASION | 14.5 | 21.25 | 5.98 | 14.4 | 21.27 | 5.38 | 12.4 | 15.91 | 2.81 |
| 2a ABRASION | 13.6 | 22.58 | 5.14 | 12.7 | 21.71 | 4.16 | 12.2 | 15.58 | 2.48 |
| 3a ABRASION | 12.4 | 21.34 | 3.95 | 12.1 | 20.17 | 3.12 | — | — | — |
| PROCESSED WHEAT | 13.3 | 15.55 | 1.21 | 13.2 | 15.33 | 1.16 | 12.7 | 13.71 | 1.68 |

TABLE 2A

ANALYSIS OF AMBER DURUM WHEATS DEBRANNED

| | TEST 3 | | | TEST 4 | | |
|---|---|---|---|---|---|---|
| | MOIST % | PROT % | ASH % | MOIST % | PROT % | ASH % |
| INLET | 12.1 | 17.18 | 1.790 | 12.1 | 17.18 | 1.790 |
| FROM 1A ABRASION | 11.9 | 17.51 | 1.669 | 12.0 | 17.43 | 1.659 |
| FROM 2A FRICTION | 12.0 | 17.43 | 1.608 | 11.8 | 17.76 | 1.582 |
| FROM 1A ABRASION | 12.0 | 16.84 | 1.239 | 11.8 | 17.52 | 1.610 |
| FROM 2A ABRASION | 12.0 | 16.51 | 0.977 | 11.8 | 17.48 | 1.608 |
| FROM 3A ABRASION | 12.0 | 16.10 | 1.148 | 12.0 | 17.20 | 1.426 |
| PROCESSED | 12.4 | 16.24 | 1.000 | 12.5 | 17.41 | 1.470 |

| | TEST 5 | | | TEST 6 | | |
|---|---|---|---|---|---|---|
| | MOIST % | PROT % | ASH % | MOIST % | PROT % | ASH % |
| INLET | 12.1 | 17.18 | 1.790 | 12.1 | 17.18 | 1.790 |
| FROM 1A FRICTION | 11.8 | 17.72 | 1.621 | 11.9 | 17.57 | 1.640 |
| FROM 2A FRICTION | 12.0 | 17.28 | 1.568 | 11.9 | 16.89 | 1.561 |
| FROM 1A ABRASION | 12.0 | 17.06 | 1.438 | 12.0 | 17.16 | 1.443 |

TABLE 2A-continued

ANALYSIS OF AMBER DURUM WHEATS DEBRANNED

| | | | | | | |
|---|---|---|---|---|---|---|
| FROM 2A ABRASION | 12.0 | 17.01 | 1.239 | 12.1 | 16.72 | 1.303 |
| FROM 3A ABRASION | 12.1 | 16.75 | 1.189 | 12.0 | 16.57 | 1.150 |
| PROCESSED | 12.4 | 16.76 | 1.150 | 12.5 | 16.37 | 1.140 |

ALL RESULTS ON DRY BASIS
PROTEIN (N × 5.7)

TABLE 3A

WHEAT ANALYSIS: RED SPRING (TESTS 7 & 8) AND SOFT WHITE SPRING (TEST 9) DEBRANNED

| | TEST 7 | | | TEST 8 | | | TEST 9 | | |
|---|---|---|---|---|---|---|---|---|---|
| WHEATS | MOIST % | PROT % | ASH % | MOIST % | PROT % | ASH % | MOIST % | PROT % | ASH % |
| INLET | 12.7 | 16.31 | 1.900 | 12.7 | 16.31 | 1.900 | 12.7 | 14.12 | 2.000 |
| FROM 1A FRICTION | 12.2 | 16.55 | 1.743 | 12.4 | 16.27 | 1.747 | 12.0 | 13.70 | 1.723 |
| FROM 2A FRICTION | 12.3 | 16.44 | 1.665 | 11.6 | 16.39 | 1.640 | 12.0 | 14.09 | 1.744 |
| FROM 1A ABRASION | 12.3 | 16.39 | 1.568 | 12.2 | 16.31 | 1.350 | 12.0 | 13.03 | |
| FROM 2A ABRASION | 12.3 | 16.21 | 1.488 | 12.4 | 15.70 | 1.273 | 12.2 | 13.79 | |
| FROM 3A ABRASION | 12.4 | 15.78 | 1.284 | 12.3 | 15.58 | 1.129 | — | — | — |
| PROCESSED | 13.3 | 15.55 | 1.210 | 13.2 | 15.33 | 1.160 | 12.7 | 13.71 | 1.660 |

ALL RESULTS ON DRY BASIS
PROTEIN (N × 5.7)

TABLE 4

TRIAL RUN: MP HARD ENGLISH WHEAT AND FRACTIONS MILLED.

| LAB # DESCRIPTION ANALYSIS | P017 DRY WHEAT | P018 PRODUCT A | P019 PRODUCT B | P063 PROD. B OVRS 20W + 9N | P064 PRODUCT B THRS 9N |
|---|---|---|---|---|---|
| Moisture % | 13.2 | 9.8 | 13.5 | 10.0 | 10.3 |
| Protein % (N × 5.7) | 13.51 | 8.69 | 23.93 | 21.53 | 24.51 |
| Ash % | 1.636 | 2.980 | 8.720 | 8.211 | 8.907 |
| Fat % | | 1.43 | 8.21 | 7.22 | 8.64 |
| FFA % | | 0.11 | 0.42 | | |
| Calcium % | 0.13 | 0.22 | 0.22 | 0.21 | 0.19 |
| Phosphorus % | 0.23 | 0.24 | 1.02 | 1.00 | 1.05 |
| Potassium % | 0.44 | 1.26 | 2.15 | 1.96 | 2.10 |
| Sodium % | 0.03 | 0.04 | 0.03 | 0.03 | 0.03 |
| Magnesium % | 0.12 | 0.10 | 0.74 | 0.67 | 0.75 |
| Iron ppm | 31.1 | 92.0 | 105.0 | 91.1 | 126.0 |
| Copper ppm | 6.9 | 4.4 | 18.5 | 18.9 | 19.0 |
| Manganese ppm | 22.0 | 74.3 | 111.0 | 138.3 | 80.3 |
| Zinc ppm | 32.9 | 44.3 | 122.5 | 106.7 | 118.2 |
| Selenium ppm | | | | | |
| Phytate Phos. % | | | | | |
| Lignin % | | | | | |
| Cellulose % | | | | | |
| Ins. DF % | | 76.99 | 32.79 | 40.27 | |
| Sol DF % | | 2.18 | 2.77 | 2.67 | |
| TDF % | 9.84 | 79.17 | 35.56 | 42.94 | 24.07 |
| Test Wt. (g/ml) | 66.3 | — | — | — | — |
| WH C% | — | 441.7 | 101.0 | 231.7 | 88.7 |
| Viscosity | — | | | | |
| Density g/100 ml | | 10.86 | 31.25 | 26.11 | 35.52 |
| Falling Number (sec.) | | | 62 | — | 62 |

| LAB # DESCRIPTION ANALYSIS | P020 PRODUCT C COARSE | P021 PRODUCT C FINE | P065 PRODUCT C (P021) OVRS 20W + 9N | P066 PRODUCT C (P021) THRU 9N |
|---|---|---|---|---|
| Moisture % | 10.9 | 10.5 | 10.1 | 10.5 |
| Protein % (N × 5.7) | 22.79 | 24.27 | 22.08 | 23.92 |
| Ash % | 5.960 | 5.464 | 6.307 | 5.531 |
| Fat % | 6.51 | 6.00 | 5.95 | 6.03 |
| FFA % | 0.25 | 0.20 | | |
| Calcium % | 0.18 | 0.16 | 0.19 | 0.16 |
| Phosphorus % | 0.74 | 0.66 | 0.80 | 0.69 |
| Potassium % | 1.53 | 1.41 | 1.56 | 1.34 |
| Sodium % | 0.03 | 0.02 | 0.02 | 0.02 |
| Magnesium % | 0.49 | 0.49 | 0.51 | 0.45 |
| Iron ppm | 76.3 | 80.4 | 84.5 | 87.2 |
| Copper ppm | 14.6 | 12.3 | 16.7 | 13.4 |
| Manganese ppm | 89.8 | 48.0 | 101.2 | 41.3 |
| Zinc ppm | 95.4 | 77.1 | 94.5 | 76.0 |
| Selenium ppm | | | | |
| Phytate Phos. % | | | | |
| Lignin % | | | | |
| Cellulose % | | | | |
| Ins. DF % | | | | |

TABLE 4-continued

| TRIAL RUN: MP HARD ENGLISH WHEAT AND FRACTIONS MILLED. | | | | |
|---|---|---|---|---|
| Sol DF % | | | | |
| TDF % | 27.24 | 12.93 | 33.09 | 11.62 |
| Test Wt. (g/ml) | — | — | — | — |
| WH C % | 87.0 | 96.7 | 117.7 | 101.7 |
| Viscosity | | | | |
| Density g/100 ml | 33.83 | 33.10 | 31.89 | 38.80 |
| Falling Number (sec.) | 62 | 188 | 62 | 339 |

All Values on Dry Basis.

TABLE 5

| | MP HARD ENGLISH WHEAT AFTER THE REMOVAL OF VARIOUS FRACTIONS | | | | | | |
|---|---|---|---|---|---|---|---|
| | DRY INLET | Ex 1st FRICTION | Ex 2nd FRICTION | Ex 1st ABRASION | Ex 2nd ABRASION | DEBRANED DRY | FEED TO MILL |
| MOISTURE % | 13.2 | 13.9 | 14.0 | 13.7 | 13.4 | 13.2 | 13.7 |
| PROTEIN % (N × 5.7) | 13.51 | 13.76 | 13.72 | 13.67 | 12.82 | 12.98 | 12.90 |
| ASH % | 1.636 | 1.585 | 1.576 | 1.217 | 1.155 | 1.123 | 1.165 |
| FAT % | | | | | | | |
| Calcium % | 0.13 | 0.09 | 0.08 | 0.07 | 0.07 | 0.12 | 0.13 |
| Phosphorus % | 0.23 | 0.16 | 0.15 | 0.14 | 0.13 | 0.17 | 0.16 |
| Potassium % | 0.44 | 0.44 | 0.40 | 0.38 | 0.32 | 0.32 | 0.32 |
| Magnesium % | 0.12 | 0.10 | 0.09 | 0.08 | 0.07 | 0.08 | 0.08 |
| Sodium % | 0.03 | 0.03 | 0.03 | 0.03 | 0.02 | 0.02 | 0.02 |
| Iron ppm | 31.1 | 29.0 | 27.9 | 26.7 | 23.1 | 24.2 | 23.2 |
| Copper ppm | 6.9 | 4.6 | 5.8 | 7.0 | 3.5 | 5.8 | 7.0 |
| Zinc ppm | 32.3 | 33.7 | 36.0 | 30.1 | 27.7 | 26.5 | 26.7 |
| Manganese ppm | 25.3 | 24.4 | 23.3 | 19.7 | 17.3 | 18.4 | 17.4 |

TABLE 6

| TRIAL RUN MP HARD ENGLISH FEED FRACTIONS OF MILLED, DEBRANNED WHEAT | | | | | | | |
|---|---|---|---|---|---|---|---|
| LAB # DESCRIPTION ANALYSIS | P022 DEBRANNED W DRY | P023 FEED TO MILL MILL | P024 COARSE BRAN | P025 FINE BRAN | P027 GERM | P028 UNTREATED CONTINENTAL FLOUR | P026 HYPROPOD |
| MOISTURE % | 13.2 | 13.7 | 11.0 | 11.2 | 11.3 | 12.9 | 11.3 |
| PROTEIN % | 12.98 | 12.90 | 20.46 | 19.98 | 21.59 | 12.06 | 19.18 |
| ASH % | 1.123 | 1.165 | 5.888 | 4.916 | 4.594 | 0.637 | 4.059 |
| FAT % | | | 2.92 | 4.34 | 5.81 | 1.30 | 4.83 |
| FFA % | | | 0.30 | 0.30 | 0.41 | 0.08 | 0.33 |
| Calcium % | 0.12 | 0.13 | 0.18 | 0.16 | 0.12 | 0.06 | 0.14 |
| Phosphorus % | 0.17 | 0.16 | 0.51 | 0.38 | 0.29 | 0.08 | 0.27 |
| Potassium % | 0.32 | 0.32 | 1.66 | 1.39 | 1.20 | 0.21 | 1.01 |
| Magnesium % | 0.08 | 0.08 | 0.43 | 0.33 | 0.29 | 0.03 | 0.26 |
| Sodium % | 0.02 | 0.02 | 0.03 | 0.05 | 0.03 | 0.01 | 0.06 |
| Iron ppm | 24.2 | 23.0 | 79.8 | 91.2 | 81.2 | 9.2 | 74.4 |
| Copper ppm | 5.8 | 7.0 | 20.2 | 16.9 | 14.7 | 2.3 | 12.4 |
| Zinc ppm | 26.5 | 26.7 | 105.6 | 112.6 | 122.9 | 14.9 | 90.2 |
| Manganese ppm | 18.4 | 17.4 | 87.6 | 98.0 | 112.7 | 8.0 | 84.6 |
| TDF % | — | 7.74 | 38.20 | 33.37 | 28.22 | 3.90 | 26.14 |

TABLE 7

| TRIAL RUN: 1 CWRS WHEAT AND FRACTION MILLED | | | | | | | | | |
|---|---|---|---|---|---|---|---|---|---|
| LAB # DESCRIPTION ANALYSIS | P035 DRY WHEAT | P036 PRODUCT A | P039 PRODUCT B | P067 B OVR 9N | P068 B THRU 9N | P041 PRODUCT C | P069 C OVR 9N | P070 C THRU 9N | P042 FEED FRACTION |
| MOISTURE % | 12.2 | 10.3 | 11.2 | 10.3 | 10.4 | 10.2 | 9.4 | 9.5 | 10.2 |
| PROTEIN (5.7 × N) % | 17.80 | 9.53 | 23.59 | 20.26 | 24.94 | 28.89 | 23.40 | 28.85 | 26.49 |
| ASH % | 1.727 | 2.687 | 8.150 | 7.648 | 8.583 | 6.040 | 7.693 | 5.856 | 6.759 |
| FAT % | — | 1.82 | 8.01 | 7.64 | 8.48 | 7.00 | 7.89 | 7.02 | 7.91 |
| Calcium % | 0.10 | 0.19 | 0.19 | 0.20 | 0.12 | 0.10 | 0.15 | 0.08 | 0.14 |
| Phosphorus % | 0.26 | 0.30 | 1.07 | 1.06 | 0.43 | 0.23 | 0.44 | 0.30 | 0.29 |
| Potassium % | 0.43 | 1.15 | 1.79 | 1.73 | 1.79 | 1.38 | 1.66 | 1.28 | 1.49 |
| Sodium % | 0.02 | 0.04 | 0.02 | 0.02 | 0.02 | 0.04 | 0.02 | 0.03 | 0.03 |
| Magnesium % | 0.16 | 0.16 | 0.79 | 0.73 | 0.81 | 0.56 | 0.73 | 0.49 | 0.62 |
| Iron ppm | 35.3 | 111.5 | 126.1 | 114.8 | 119.4 | 98.0 | 100.4 | 87.3 | 98.0 |
| Copper ppm | 5.7 | 7.8 | 14.6 | 14.5 | 16.7 | 13.4 | 15.5 | 12.2 | 13.4 |
| Manganese ppm | 41.0 | 126.0 | 205.0 | 272.0 | 140.6 | 80.2 | 220.8 | 61.9 | 165.9 |
| Zinc ppm | 35.3 | 45.7 | 118.2 | 113.7 | 120.5 | 83.5 | 123.6 | 80.7 | 112.5 |
| TDF % | 13.75 | 77.9 | 42.12 | 50.85 | 33.77 | 18.63 | 43.52 | 17.29 | 30.56 |
| Test Weight (g/ml) | 65.0 | — | — | — | — | — | — | — | — |
| WHC % | — | 434.7 | 108.0 | 230.3 | 103.3 | 90.0 | 126.7 | 100.0 | 99.3 |

TABLE 7-continued

| LAB # DESCRIPTION ANALYSIS | P035 DRY WHEAT | P036 PRODUCT A | P039 PRODUCT B | P067 B OVR 9N | P068 B THRU 9N | P041 PRODUCT C | P069 C OVR 9N | P070 C THRU 9N | P042 FEED FRACTION |
|---|---|---|---|---|---|---|---|---|---|
| | TRIAL RUN: 1 CWRS WHEAT AND FRACTION MILLED | | | | | | | | |
| Density g/100 ml | — | 8.32 | 33.86 | 25.74 | 32.55 | 43.02 | 33.94 | 39.30 | 39.62 |

TABLE 8

CWRS WHEAT AFTER REMOVAL OF VARIOUS FRACTIONS

| | DRY INLET | Ex 1st FRICTION | Ex 2nd FRICTION | Ex 1st ABRASION | Ex 2nd ABRASION | FEED TO MILL |
|---|---|---|---|---|---|---|
| MOISTURE % | 12.3 | 12.7 | 12.8 | 11.8 | 11.7 | 12.2 |
| PROTEIN % (N × 5.7) | 17.80 | 18.00 | 18.08 | 17.91 | 16.80 | 17.18 |
| ASH % | 1.727 | 1.827 | 1.749 | 1.474 | 1.319 | 1.350 |
| FAT % | | | | | | |
| Calcium % | 0.10 | 0.05 | 0.06 | 0.05 | 0.05 | 0.05 |
| Phosphorus % | 0.26 | 0.13 | 0.11 | 0.10 | 0.09 | 0.08 |
| Potassium % | 0.43 | 0.33 | 0.33 | 0.28 | 0.25 | 0.32 |
| Sodium % | 0.02 | 0.03 | 0.03 | 0.03 | 0.02 | 0.05 |
| Magnesium % | 0.16 | 0.13 | 0.13 | 0.10 | 0.08 | 0.09 |
| Iron ppm | 35.3 | 27.5 | 26.4 | 22.7 | 18.1 | 22.8 |
| Copper ppm | 5.7 | 5.7 | 4.6 | 7.9 | 7.9 | 5.7 |
| Manganese ppm | 41.0 | 32.1 | 32.1 | 26.1 | 22.7 | 22.8 |
| Zinc ppm | 35.3 | 37.8 | 35.6 | 36.3 | 31.7 | 29.6 |

TABLE 8A

MICROBIOLOGICAL ANALYSIS OF FRACTIONS

| | | TPC/g | COLIFORM/g | *E. COLI* | YEAST/MOULD | SALMONELLA | *STAPH. AUREUS* COAG + | *STAPH. AUREUS* COUNT |
|---|---|---|---|---|---|---|---|---|
| | HARD ENGLISH WHEAT | | | | | | | |
| P018 | PRODUCT A | 500 | <3 | <3 | 30 | NEG | NF | NF |
| P019 | PRODUCT B | 20,000 | <3 | <3 | 80 | NEG | NF | 40,000 |
| P020 | PRODUCT C COARSE | 1,000 | 4 | <3 | 60 | NEG | NF | 100 |
| P021 | PRODUCT C FINE | 400 | 9 | <3 | <10 | NEG | NF | 1,000 |
| | 1 CWRS | | | | | | | |
| P036 | PRODUCT A | 200 | 9 | <3 | <10 | NEG | NF | NF |
| P039 | PRODUCT B | 30,000 | 240 | <3 | 200 | NEG | NF | 100 |
| P041 | PRODUCT C | 4,000 | 93 | <3 | 110 | NEG | NF | 200 |
| P042 | PRODUCT C FEED | 3,000 | 93 | <3 | 800 | NEG | NF | 5,000 |

TABLE 9

AMINO ACID CONTENT OF FRACTIONS FROM 3CW WHEAT
A: AVERAGE PROTEIN BASIS %
B: AVERAGE DRY MATTER BASIS %

| | PRODUCT A | | PRODUCT B | | PRODUCT B THRU 9N | | PRODUCT C | |
|---|---|---|---|---|---|---|---|---|
| | A | B | A | B | A | B | A | B |
| TRYPTOPHAN | 1.202 | 0.068 | 1.681 | 0.431 | 1.605 | 0.473 | 1.325 | 0.407 |
| LYSINE | 4.263 | 0.241 | 4.220 | 1.081 | 4.496 | 1.325 | 2.879 | 0.885 |
| HISTIDINE | 3.244 | 0.183 | 3.266 | 0.837 | 3.351 | 0.988 | 2.641 | 0.812 |
| AMMONIA | 2.929 | 0.166 | 2.764 | 0.708 | 3.516 | 1.037 | 3.530 | 1.085 |
| ARGININE | 6.077 | 0.343 | 7.667 | 1.964 | 7.978 | 2.352 | 5.716 | 1.756 |
| ASPARTIC ACID | 9.487 | 0.536 | 7.079 | 1.813 | 6.003 | 1.770 | 5.670 | 1.742 |
| THREONINE | 4.609 | 0.261 | 3.204 | 0.821 | 3.142 | 0.926 | 3.011 | 0.925 |
| SERINE | 5.122 | 0.289 | 4.339 | 1.111 | 4.885 | 1.440 | 4.432 | 1.362 |
| GLUTAMIC ACID | 14.832 | 0.838 | 18.962 | 4.857 | 24.659 | 7.270 | 27.992 | 8.601 |
| CYSTINE | 4.220 | 0.239 | 1.695 | 0.434 | 1.598 | 0.471 | 1.815 | 0.558 |
| GLYCINE | 6.981 | 0.395 | 5.603 | 1.435 | 5.932 | 1.749 | 4.467 | 1.372 |
| ALANINE | 6.673 | 0.377 | 4.825 | 1.236 | 4.237 | 1.249 | 4.142 | 1.273 |
| VALINE | 6.000 | 0.339 | 4.785 | 1.226 | 4.359 | 1.285 | 4.572 | 1.405 |
| METHIONINE | 1.798 | 0.102 | 1.509 | 0.386 | 1.736 | 0.512 | 1.551 | 0.477 |
| ISOLEUCINE | 4.147 | 0.234 | 3.351 | 0.858 | 3.379 | 0.996 | 3.493 | 1.073 |
| LEUCINE | 7.321 | 0.414 | 6.310 | 1.616 | 6.986 | 2.060 | 6.470 | 1.988 |
| TYROSINE | 4.635 | 0.262 | 3.096 | 0.793 | 3.441 | 1.015 | 3.164 | 0.972 |
| PHENYLALANINE | 4.692 | 0.265 | 4.122 | 1.056 | 4.934 | 1.455 | 4.673 | 1.436 |

| | TOTAL FEED A + B + C | | TOTAL FEED | | BRAN UK BUHLER | | SHORTS UK BUHLER | |
|---|---|---|---|---|---|---|---|---|
| | A | B | A | B | A | B | A | B |
| TRYPTOPHAN | 1.205 | 0.268 | 1.440 | 0.338 | 1.571 | 0.358 | 1.671 | 0.369 |
| LYSINE | 3.611 | 0.804 | 5.229 | 1.228 | 4.083 | 0.931 | 4.506 | 0.996 |
| HISTIDINE | 2.891 | 0.644 | 3.381 | 0.794 | 2.838 | 0.647 | 2.935 | 0.649 |

TABLE 9-continued

| AMINO ACID CONTENT OF FRACTIONS FROM 3CW WHEAT<br>A: AVERAGE PROTEIN BASIS %<br>B: AVERAGE DRY MATTER BASIS % | | | | | | | | |
|---|---|---|---|---|---|---|---|---|
| AMMONIA | 3.098 | 0.690 | 3.107 | 0.729 | 3.092 | 0.705 | 2.856 | 0.631 |
| ARGININE | 6.280 | 1.398 | 7.848 | 1.842 | 6.592 | 1.502 | 7.142 | 1.579 |
| ASPARTIC ACID | 6.022 | 1.341 | 6.615 | 1.553 | 6.812 | 1.553 | 7.176 | 1.587 |
| THREONINE | 3.147 | 0.700 | 3.381 | 0.794 | 3.297 | 0.752 | 3.340 | 0.739 |
| SERINE | 4.472 | 0.995 | 4.736 | 1.112 | 4.497 | 1.025 | 4.489 | 0.993 |
| GLUTAMIC ACID | 23.463 | 5.223 | 20.729 | 4.867 | 21.177 | 4.827 | 19.084 | 4.220 |
| CYSTINE | 1.985 | 0.442 | 2.009 | 0.472 | 2.238 | 0.510 | 2.251 | 0.498 |
| GLYCINE | 5.090 | 1.133 | 5.974 | 1.403 | 5.160 | 1.176 | 5.298 | 1.171 |
| ALANINE | 4.256 | 0.947 | 4.691 | 1.101 | 4.600 | 1.048 | 4.941 | 1.093 |
| VALINE | 4.509 | 1.004 | 4.620 | 1.085 | 4.724 | 1.077 | 4.941 | 1.093 |
| METHIONINE | 1.562 | 0.348 | 1.692 | 0.397 | 1.703 | 0.388 | 1.729 | 0.382 |
| ISOLEUCINE | 3.404 | 0.758 | 3.404 | 0.799 | 3.464 | 0.790 | 3.466 | 0.766 |
| LEUCINE | 6.449 | 1.436 | 6.905 | 1.621 | 6.533 | 1.489 | 6.561 | 1.451 |
| TYROSINE | 3.244 | 0.722 | 3.495 | 0.821 | 3.083 | 0.703 | 3.126 | 0.691 |
| PHENYLALANINE | 4.511 | 1.004 | 4.686 | 1.100 | 4.358 | 0.993 | 4.248 | 0.939 |

TABLE 10

ESSENTIAL AMINO ACID PROFILE (g/100 g PROTEIN)

| | PRODUCT A | PRODUCT B | PRODUCT B THRU 9N | PRODUCT C | TOTAL FEED A + B + C | TOTAL FEED |
|---|---|---|---|---|---|---|
| HISTIDINE | 3.31 | 3.69 | 3.48 | 2.88 | 3.24 | 3.60 |
| LYSINE | 4.35 | 4.77 | 4.67 | 3.15 | 4.05 | 5.57 |
| THREONINE | 4.70 | 3.62 | 3.26 | 3.29 | 3.53 | 3.60 |
| VALINE | 6.11 | 5.41 | 4.53 | 4.99 | 5.05 | 4.92 |
| LEUCINE | 7.46 | 7.13 | 7.26 | 7.07 | 7.23 | 7.35 |
| ISOLEUCINE | 4.23 | 3.79 | 3.51 | 3.82 | 3.82 | 3.62 |
| TYROSINE | 4.72 | 3.50 | 3.58 | 3.46 | 3.64 | 3.72 |
| PHENYLALANINE | 4.78 | 4.66 | 5.13 | 5.10 | 5.06 | 4.99 |
| PHENYL + TYROSINE | 9.50 | 8.16 | 8.71 | 8.56 | 8.70 | 8.71 |
| TRYPTOPHAN | 1.23 | 1.90 | 1.67 | 1.45 | 1.35 | 1.54 |
| METHIONINE | 1.84 | 1.71 | 1.81 | 1.70 | 1.75 | 1.80 |
| METH + CYSTEINE | | | | | | |

| | BRAN UK BUHLER | SHORTS UK BUHLER | IDEAL PATTERN ADULT | GLUTEN | SOY BEANS | COW MILK |
|---|---|---|---|---|---|---|
| HISTIDINE | 3.16 | 3.27 | 0.00 | 1.30 | 2.80 | 2.70 |
| LYSINE | 4.55 | 5.02 | 2.20 | 0.78 | 7.00 | 7.80 |
| THREONINE | 3.67 | 3.72 | 1.30 | 1.83 | 4.20 | 4.40 |
| VALINE | 5.26 | 5.50 | 1.80 | 3.91 | 5.30 | 6.40 |
| LEUCINE | 7.27 | 7.31 | 2.50 | 5.13 | 8.50 | 9.50 |
| ISOLEUCINE | 3.86 | 3.86 | 1.80 | 2.87 | 5.00 | 4.70 |
| TYROSINE | 3.43 | 3.48 | | 1.74 | | |
| PHENYLALANINE | 4.85 | 4.73 | | 2.78 | | |
| PHENYL + TYROSINE | 8.28 | 8.21 | 2.50 | 4.52 | 8.80 | 10.20 |
| TRYPTOPHAN | 1.75 | 1.86 | 0.65 | 0.52 | 1.40 | 1.40 |
| METHIONINE | 1.90 | 1.93 | | 1.04 | | |
| METH + CYSTEINE | | | 2.40 | | 2.80 | 3.30 |

EXAMPLES

A series of rune were made on different types of wheat from soft wheat to hard wheat in order to assess the operation of the present invention on a wide variety of product types. The apparatus was set up as shown in FIG. 9. The bran product collected in the first and second friction operation has been designated Product A and has been found to contain a high dietary fibre content. Product A consists primarily of the 3–4 outer bran layers and has little or no phytate phosphorous present. The bran layers removed during the first abrasion operation are designated Product B and were separately collected. Product B consists primarily of the middle layers of the bran coat, although some aleurone layers were detected. Product B is high in protein and lower in dietary and lower in dietary fibre.

The bran layers removed during the second abrasion operation were designated Product C were also separately collected and consist primarily of the aleurone layers with some seed coat and hyaline layer present.

Products B & C due to their relatively high vitamin content may be a source of vitamins or minerals or utilized in the food and pharmaceutical products.

For analysis the samples of each of Product A, B & C were sifted into line and course particles.

In Examples 1 and 2 the Spanish wheat had "sprouted" and been rejected for milling. Kernels which have sprouted have a high alpha-amylase activity which adversely affects baking characteristics. A test to determine alpha-amylase activity measures the Falling Number. Falling Numbers of 200 or above are considered acceptable for milling. The Spanish wheat initially had a Falling Number of 163 in Example 1 and 118 in Example 2, however after processing by the present invention the Falling Number had increased to 247 and 214 respectively. The wheat after processing was added to a grist of wheat being milled by conventional techniques at a rate of 15%. The baking characteristics of the resulting flour were acceptable.

EXAMPLE NO. 1

GRAIN DESCRIPTION: Spanish Hard Wheat

FEED RATE: 4150 Kg/hr.
MOISTURE ADDED IN DAMPENING MIXER 2.0%
FIRST FRICTION: 750 RPM
SECOND FRICTION: 750 RPM; MOISTURE ADDED ¼%
PRODUCT A:
AMOUNT RECOVERED: 131 kg/hr.

| ANALYSIS | Fine | Course |
|---|---|---|
| Oil | 1.35% | 1.25% |
| Protein | 7.90% | 5.60% |
| Ash | 3.30% | 2.10% |
| Moisture | 21.4% | 20.8% |
| Calcium (CA) | 0.28% | 0.25% |
| Phosphorus (P) | 0.27% | 0.20% |
| Potassium (K) | 0.90% | 0.87% |
| Dietary Fibre | 79.1% | 87.5% |
| Phytate mg/100 gm | 102 | 246 |

FIRST ABRASION: 942 RPM;
PRODUCT B:
AMOUNT RECOVERED: 122 kg/hr.

| ANALYSIS | Fine | Course |
|---|---|---|
| Oil | 8.20% | 7.30% |
| Protein | 22.5% | 19.75% |
| Ash | 8.10% | 7.10% |
| Moisture | 10.6% | 10.5% |
| Calcium (CA) | 0.13% | 0.22% |
| Phosphorus (P) | 1.06% | 0.98% |
| Potassium (K) | 2.02% | 1.73% |
| Dietary Fibre | 24.4% | 41.1% |
| Phytate (P) mg/100 gm | 1577 | 1308 |

SECOND ABRASION: 942 RPM;
PRODUCT C:
AMOUNT RECOVERED: 142 kg/hr.

| ANALYSIS | Fine | Course |
|---|---|---|
| Oil | 6.45% | 6.45% |
| Protein | 22.88% | 22.10% |
| Ash | 5.15% | 5.30% |
| Moisture | 10.3% | 10.3% |
| Calcium (CA) | 0.16% | 0.13% |
| Phosphorus (P) | 1.04% | 0.89% |
| Potassium (K) | 1.41% | 1.43% |
| Dietary Fibre | 17.5% | 18.4% |
| Phytate (P) mg/100 gm | 981 | 982 |

BREAKAGE & GERM
AMOUNT RECOVERED: 62 kg/hr.
% BREAKAGE: 1.5%
FLOW RATE TO TEMPER BINS: 3745 kg/hr.

EXAMPLE NO. 2

GRAIN DESCRIPTION: Spanish Hard Wheat (FN=118)
FEED RATE: 3750 Kg/hr.
MOISTURE ADDED IN DAMPENING MIXER: 2%
FIRST FRICTION: 750 RPM
SECOND FRICTION: 750 RPM; MOISTURE ADDED ¼%
PRODUCT A:
AMOUNT RECOVERED: 112 Kg/Hr.
FIRST ABRASION: 942 RPM;
PRODUCT B:
AMOUNT RECOVERED: 94 Kg/Hr
SECOND ABRASION:
AMOUNT RECEIVED 121 Kg/Hr.
BREAKAGE AND GERM
AMOUNT RECOVERED 39 Kg/Hr.
% BREAKAGE 1.1%
FLOW RATE TO TEMPER BINS 3413 Kg/Hr.
(F.N.=214)

EXAMPLE NO. 3

GRAIN DESCRIPTION: Danish Hard Wheat (FN=260)
FEED RATE: 3800 kg/hr.
MOISTURE ADDED IN DAMPENING MIXER: 1.5%
FIRST FRICTION: 750 RPM
SECOND FRICTION: 750 RPM: MOISTURE ADDED ¼%
PRODUCT A:
AMOUNT RECOVERED 97 kg/hr.
ANALYSIS

| ANALYSIS | | DIETARY FIBRE (NDF) | |
|---|---|---|---|
| | MOISTURE | As Received | Dry Basis |
| COARSE PARTICLES | 12.81% | 69.2% | 79.4% |
| FINE PARTICLES | 12.89% | 62.1% | 71.3% |

FIRST ABRASION: 840 RPM;
PRODUCT B:
AMOUNT RECOVERED: 93 kg/hr.
SECOND ABRASION: 840 RPM;
PRODUCT C:
AMOUNT RECOVERED: 112 kg/hr.
ANALYSIS:
MOISTURE % 10.45
ASH % 4.55
PROTEIN % 16.25
DIETARY FIBRE NDF % 19.6
OIL % 4.90
STARCH % 34.7
PROTEIN SOLUBLE % 3.9
PHYTATE PHOSPHOROUS mg/100 gm 1020
CALCIUM (Ca) % 0.32
PHOSPHOROUS (P) % 1.09
POTASIUM (K) % 1.13
MAGNESIUM (Mg) % 0.32
IRON (Fe) mg/kg 122
VITAMIN B. mg/kg 5.0 (thiamine)
VITAMIN $B^2$ mg/kg 2.2 (riboflavin)
NIACIN mg/kg 192
BREAKAGE & GERM
AMOUNT RECOVERED: 47 kg/hr.
% BREAKAGE: 1.3%
FLOW RATE TO TEMPER BINS: 3410 kg/hr. (F.N.=310)
FLOUR COLOUR VALUE: 2.4 (improved from 3.6)

EXAMPLE NO. 4

GRAIN DESCRIPTION: XMR—Hard English Wheat (FN=200)
FEED RATE: 3500 kg/hr.

MOISTURE ADDED IN DAMPENING MIXER: 1.25%

FIRST FICTION: 750 RPM

SECOND FRICTION: 750 RPM: MOISTURE ADDED ¼%

PRODUCT A:

AMOUNT RECOVERED: 84 kg/hr.

ANALYSIS

| ANALYSIS | Fine | Course |
|---|---|---|
| Ash | 2.05% | 2.55% |
| Starch | 9.9% | 11.8% |
| Dietary Fibre | 58.9% | 69.2% |

FIRST ABRASION: 840 RPM;

PRODUCT B:

AMOUNT RECOVERED: 68 Kg/Hr.

ANALYSIS

| ANALYSIS | |
|---|---|
| Ash | 7.6% |
| Protein | 19.2% |
| Dietary Fibre | 23.9% |
| Starch | 22.4% |
| Protein (soluble) | 8.1% |
| Phytate Phosphorous | 1175 mg/100 gram |
| Vitamin $B^1$ | 6.0 mg/kg |
| Vitamin $B^2$ | 2.6 mg/kg |
| Niacin | 327 mg/kg |

SECOND ABRASION: 840 RPM;

PRODUCT C:

AMOUNT RECOVERED: 110 kg/hr.

PRODUCT C:

ANALYSIS

| ANALYSIS | |
|---|---|
| Ash | 4.6% |
| Protein | 18.15% |
| Dietary Fibre | 11.9% |
| Starch | 40.3% |
| Protein Soluble | 5.3% |
| Phytate Phosphorous | 880 mg/100 gram |
| Vitamin $B^1$ | 4.6 mg/kg |
| Vitamin $B^2$ | 1.7 mg/kg |
| Niacin | 180 mg/kg |

BREAKAGE & GERM

AMOUNT RECOVERED: 48 kg/hr.

% BREAKAGE: 1.5%

FLOW RATE TO TEMPER BINS: 3220 kg/hr. (FN=250)

FLOUR COLOUR VALUE: 2.5 (improved from 3.7)

EXAMPLE NO. 5

GRAIN DESCRIPTION: CWRS (Canadian Western Spring Wheat)

FEED RATE: 3750 Kg/Hr.

MOISTURE ADDED IN DAMPENING MIXER: 2.0

FIRST FRICTION: 750 RPM

SECOND FRICTION: 750 RPM; MOISTURE ADDED ¼%

PRODUCT A:

AMOUNT RECOVERED: 118 kg/hr

ANALYSIS

| ANALYSIS | Fine | Medium |
|---|---|---|
| DIETARY FIBRE (dry basis) | 69.6% | 76.6% |
| MOISTURE | 13.69 | 12.59 |

FIRST ABRASION: 840 RPM:

PRODUCT B:

AMOUNT RECOVERED: 97 kg/hr

ANALYSIS

MOISTURE % 10.60

ASH % 7.20

PROTEIN % 20.5

DIETARY FIBRE NDF % 39.9

OIL % 6.10

STARCH % 10.8

PROTEIN SOLUBLE % 5.0

PHYTATE PHOSPHOROUS mg/100 gm 1470

CALCIUM (ca) % 0.10

PHOSPHOROUS (P) % 1.68

POTASSIUM (K) % 1.56

MAGNESIUM (Mg) % 0.50

IRON (Fe) mg/kg 171

VITAMIN $B^1$ mg/kg 7.1 (thiamine)

VITAMIN $B^2$ mg/kg 2.9 (riboflavin)

NIACIN mg/kg 304

SECOND ABRASION: 840 RPM

PRODUCT C:

AMOUNT RECOVERED: 122 kg/hr,

ANALYSIS

MOISTURE % 10.35

ASH % 5.00

PROTEIN % 24.8

DIETARY FIBRE NDF % 22.8

OIL % 5.70

STARCH % 24.8

PROTEIN SOLUBLE % 5.3

PHYTATE PHOSPHOROUS mg/100 gm 1100

CALCIUM (Ca) % 0.18

PHOSPHOROUS (P) % 1.28

POTASSIUM (K) % 1.09

MAGNESIUM (Mg) % 0.41

IRON (Fe) mg/kg 122

VITAMIN B, mg/kg 6.6 (thiamine)

VITAMIN$^2$ mg/kg 2.6 (riboflavin)

NIACIN mg/kg 285

BREAKAGE & GERM

AMOUNT RECOVERED: 63 kg/hr,

% BREAKAGE: 1.7%

EXAMPLE NO. 6

The following analysis was performed on products A, B, and C obtained by processing Spanish wheat in accordance with the apparatus of FIG. 9. Products A, B and C were divided into course and fine particles.

| | A-fine | A-coarse | B-fine | B-coarse | C-fine | C-coarse |
|---|---|---|---|---|---|---|
| Moisture (as red'd | 21.40% | 20.80% | 10.60% | 10.55% | 10.35% | 10.35% |

ANALYSIS ON D.M. BASIS

-continued

| | A-fine | A-coarse | B-fine | B-coarse | C-fine | C-coarse |
|---|---|---|---|---|---|---|
| Oil (Procedure A) | 1.35% | 1.25% | 8.2% | 7.3% | 6.45% | 6.45% |
| Protein | 7.9% | 5.6% | 22.75% | 19.75% | 22.85% | 22.1% |
| Ash | 3.3% | 2.1% | 8.1% | 7.1% | 5.15% | 5.3% |
| Calcium (Ca) | 0.28% | 0.25% | 0.13% | 0.22% | 0.16% | 0.13% |
| Phosphorus (P) | 0.27% | 0.20% | 1.06% | 0.98% | 1.04% | 0.89% |
| Potassium (K) | 0.90% | 0.87% | 2.02% | 1.73% | 1.41% | 1.43% |
| Magnesium (Mg) | 654 mg/kg | 649 mg/kg | 808 mg/kg | 803 mg/kg | 772 mg/kg | 744 mg/kg |
| Iron (Fe) | 467 mg/kg | 307 mg/kg | 257 mg/kg | 233 mg/kg | 184 mg/kg | 184 mg/kg |
| NDF (enzymic) | 79.6% | 87.5% | 24.4% | 41.6% | 17.5% | 18.4% |
| Starch | 16.8% | 13.8% | 26.0% | 12.7% | 42.4% | 29.3% |
| Lignin | 2.8% | 0.2% | 1.1% | 1.8% | 0.2% | 0.3% |
| Cellulose | 30.3% | 24.7% | 8.2% | 12.4% | 2.8% | 8.1% |
| Phytate phosphorus (as P) | 100 mg/kg | 245 mg/kg | 1580 mg/kg | 1310 mg/kg | 980 mg/kg | 980 mg/kg |
| Protein soluble in 5% potassium sulphate | 1.4% | 1.0% | 10.6% | 10.1% | 8.5% | 9.3% |
| Copper (Cu) | 7.8 mg/kg | 6.1 mg/kg | 20 mg/kg | 19 mg/kg | 14.5 mg/kg | 14.5 mg/kg |
| Zinc (Zn) | 83 mg/kg | 53 mg/kg | 139 mg/kg | 123 mg/kg | 110 mg/kg | 117 mg/kg |
| Selenium (Se) | — | — | — | — | 0.1 mg/kg | 0.09 mg/kg |
| Thiamine | 2.5 mg/kg | 1.9 mg/kg | 8.8 mg/kg | 7.2 mg/kg | 6.8 mg/kg | 7.3 mg/kg |
| Riboflavin | 3.1 mg/kg | 1.6 mg/kg | 2.9 mg/kg | 2.7 mg/kg | 1.9 mg/kg | 2.0 mg/kg |
| Niacin | Less than 30 mg/kg | Less than 30 mg/kg | 351 mg/kg | 292 mg/kg | 210 mg/kg | 201 mg/kg |

The method steps and apparatus therefor, have been described in the preferred embodiment where the bran layers are stripped to expose the endosperm or where the bran layers has been removed with a portion of the aleurone cells remaining to maximize the yield of endosperm.

Although various preferred embodiments of the present invention have been described herein in detail, it will be appreciated by those skilled in the art, that variations may be made thereto without departing from the spirit of the invention or the scope of the appended claims.

I claim:

1. A composition of matter comprising seed coat, nucellar and aleurone layers of bran coat removed from wheat kernels, the composition having an amount of protein between 18 and 30% by weight on a dry basis and an amount of starch greater than 10% by weight.

2. The composition of claim 1 containing approximately 20% to 25% protein.

3. The composition of claim 2 containing approximately 6.1% to 8.2% oil.

4. The composition of claim 3 containing approximately 7.1%-8.1% ash.

5. A composition of matter consisting essentially of seed coat, nucellar and aleurone layers of bran coat removed from wheat kernels, the composition having an amount of protein between 18 and 30% by weight on a dry basis and an amount of starch greater than 10% by weight.

6. The composition of claim 5 containing approximately 20% to 25% protein.

7. The composition of claim 5 containing approximately 6.1% to 8.2% oil.

8. The composition of claim 5 containing approximately 7.1% to 8.1% ash.

9. A composition of matter extracted from wheat kernels which are comprised of endosperm encased in a bran coat, the bran coat including an aleurone cell layer covered by a nucellar cell layer covered by a seed coat layer covered by a tube cell layer covered by a cross cell layer covered by a hypodermis layer covered by an epidermis layer; the extracted composition consisting essentially of the seed coat, nucellar and aleurone layers of the bran coat.

* * * * *

UNITED STATES PATENT AND TRADEMARK OFFICE
CERTIFICATE OF CORRECTION

PATENT NO. : 5,387,430

DATED : February 7, 1995

INVENTOR(S) : Joseph J. Tkac

It is certified that error appears in the above-identified patent and that said Letters Patent is hereby corrected as shown below:

TITLE PAGE:

At item [63], line 1, delete "286,347" and insert therefor --286,374--.

In the Abstract, line 4, delete "aledrone" and insert therefor --aleurone--.

At column 2, line 43, delete "fraction" and insert therefor --friction--.

At column 4, line 16, delete "showing" and insert therefor --shown--.

At column 4, line 48, delete ",".

At column 4, line 66, delete "Cross" and insert therefor --cross--.

At column 5, line 12, delete "abrasion" and insert therefor --Abrasion--.

At column 5, line 17, delete "320" and insert therefor --328--.

At column 5, line 23, delete "fraction" and insert therefor --friction--.

At column 5, line 26, delete "add" and insert therefor --and--.

At column 5, line 49, delete "no" and insert therefor --now--.

UNITED STATES PATENT AND TRADEMARK OFFICE
CERTIFICATE OF CORRECTION

PATENT NO. : 5,387,430
DATED : February 7, 1995
INVENTOR(S) : Joseph J. Tkac

It is certified that error appears in the above-identified patent and that said Letters Patent is hereby corrected as shown below:

At column 5, line 67, delete "end" and insert therefor --and--.

At column 6, lines 40-41, delete "The control member 116.".

At column 6, line 47, delete the second occurrence of "the" and insert therefor --The--.

At column 6, line 65, delete "," and insert therefor --.--.

At column 7, line 5, delete "," and insert therefor --.--.

At column 9, line 43, delete "ere" and insert therefor --are--.

At column 9, line 44, delete "cheer" and insert therefor --chamber--.

At column 10, line 66, delete "An" and insert therefor --in--.

At column 16, Table 5, in the column heading, delete "DEBRANED" and insert therefor --DEBRANNED--.

At column 19, line 50, delete "rune" and insert therefor --runs--.

At column 19, line 64, delete "and lower in dietary".

UNITED STATES PATENT AND TRADEMARK OFFICE

CERTIFICATE OF CORRECTION

PATENT NO. : 5,387,430

DATED : February 7, 1995

INVENTOR(S) : Joseph J. Tkac

It is certified that error appears in the above-identified patent and that said Letters Patent is hereby corrected as shown below:

At column 20, line 51, delete "line" and insert therefor --fine--.

At column 21, line 12, delete "Course" and insert therefor --Coarse--.

At column 21, line 27, delete "Course" and insert therefor --Coarse--.

At column 21, line 43, delete "Course" and insert therefor --Coarse--.

At column 22, line 24, delete "ANALYSIS".

At column 23, line 8, delete "ANALYSIS".

At column 23, line 12, delete "Course" and insert therefor --Coarse--.

At column 23, line 20, delete "ANALYSIS".

At column 23, line 36, delete "ANALYSIS".

UNITED STATES PATENT AND TRADEMARK OFFICE

CERTIFICATE OF CORRECTION

PATENT NO. : 5,387,430

DATED : February 7, 1995

INVENTOR(S) : Joseph J. Tkac

It is certified that error appears in the above-indentified patent and that said Letters Patent is hereby corrected as shown below:

At column 24, line 6, delete "ANALYSIS".

Signed and Sealed this

Nineteenth Day of March, 1996

Attest:

BRUCE LEHMAN

*Attesting Officer* *Commissioner of Patents and Trademarks*